United States Patent [19]

Bowes et al.

[11] Patent Number: 5,805,927
[45] Date of Patent: Sep. 8, 1998

[54] DIRECT MEMORY ACCESS CHANNEL ARCHITECTURE AND METHOD FOR RECEPTION OF NETWORK INFORMATION

[75] Inventors: Michael J. Bowes, Cupertino; Brian A. Childers, Santa Clara, both of Calif.

[73] Assignee: Apple Computer, Inc., Cupertino, Calif.

[21] Appl. No.: 936,806

[22] Filed: Sep. 24, 1997

Related U.S. Application Data

[63] Continuation of Ser. No. 610,672, Mar. 4, 1996, abandoned, which is a continuation of Ser. No. 189,131, Jan. 28, 1994, abandoned.

[51] Int. Cl.$^6$ .................................................. G06F 13/10
[52] U.S. Cl. ............................................ 395/843; 395/854
[58] Field of Search .............................. 395/842, 843, 395/854, 872

[56] References Cited

U.S. PATENT DOCUMENTS

| | | | |
|---|---|---|---|
| 4,658,350 | 4/1987 | Eggebrecht et al. | 395/846 |
| 4,695,952 | 9/1987 | Howland | 395/308 |
| 4,730,248 | 3/1988 | Watanabe et al. | 395/375 |
| 4,811,306 | 3/1989 | Boning et al. | 365/200 |
| 4,831,523 | 5/1989 | Lewis et al. | 395/848 |
| 4,878,166 | 10/1989 | Johnson et al. | 395/425 |
| 4,935,868 | 6/1990 | DuLac | 395/290 |
| 5,056,011 | 10/1991 | Yoshitake et al. | 395/848 |
| 5,111,425 | 5/1992 | Takeuchi et al. | 395/425 |
| 5,142,672 | 8/1992 | Johnson et al. | 395/500 |
| 5,155,830 | 10/1992 | Kurashige | 395/425 |
| 5,175,825 | 12/1992 | Starr | 395/425 |
| 5,185,877 | 2/1993 | Bissett et al. | 395/425 |
| 5,187,780 | 2/1993 | Clark et al. | 395/286 |
| 5,212,795 | 5/1993 | Hendry | 395/848 |
| 5,228,130 | 7/1993 | Michael | 395/828 |
| 5,241,661 | 8/1993 | Concilio et al. | 395/860 |
| 5,255,374 | 10/1993 | Aldereguia et al. | 395/293 |
| 5,287,457 | 2/1994 | Arimilli et al. | 395/308 |
| 5,287,471 | 2/1994 | Kaytayose et al. | 395/842 |
| 5,291,582 | 3/1994 | Drako et al. | 395/425 |
| 5,305,317 | 4/1994 | Szczepanek | 370/85.5 |
| 5,319,792 | 6/1994 | Ehlig et al. | 395/800 |
| 5,345,566 | 9/1994 | Tanji et al. | 395/308 |
| 5,355,452 | 10/1994 | Lam et al. | 395/308 |
| 5,369,748 | 11/1994 | McFarland et al. | 395/306 |
| 5,373,493 | 12/1994 | Iizuka | 369/124 |
| 5,381,538 | 1/1995 | Amini et al. | 395/483 |
| 5,388,217 | 2/1995 | Benzschawel et al. | 395/856 |

(List continued on next page.)

OTHER PUBLICATIONS

John P. Hayes, "Digital System Design and Microprocessors", 1984, pp. 644–650.

Hal Kop, "Hard Disk Controller Design Using the Intel® 8089", pp. 3–62–3–74.

"iAPX 86/88, 186/188 User's Manual Hardware Reference", Intel Corporation, 1985, pp. 4–1–4–40.

"8089 8 & 16–Bit HMOS I/O Processor", 1980, pp. 3–161–3–174.

*Primary Examiner*—Eddie P. Chan
*Assistant Examiner*—Hiep T. Nguyen
*Attorney, Agent, or Firm*—Blakely, Sokoloff, Taylor & Zafman

[57] ABSTRACT

An ethernet receive channel, corresponding to an ethernet controller, is contained within a direct memory access (DMA) controller. The DMA controller is connected to the CPU bus of a computer system through a bus interface and is also connected to an I/O bus, which is coupled to one or more I/O controllers, including an ethernet controller. The ethernet receive channel contains a buffer and multiple register sets storing the number of packets to be received for a particular DMA transfer, the address where the next byte of the incoming ethernet packet will be written in memory, and control information for the transfer. The address registers are initially programmed with the starting location for the transfer in main memory, which correspond to segments within chains of contiguous physical memory. During a transfer, the address registers are updated to contain the location where the next portion of the incoming ethernet packet will be written in memory.

17 Claims, 10 Drawing Sheets

U.S. PATENT DOCUMENTS

| | | | |
|---|---|---|---|
| 5,396,602 | 3/1995 | Amini et al. | 395/293 |
| 5,404,522 | 4/1995 | Carmon et al. | 395/650 |
| 5,450,551 | 9/1995 | Amini et al. | 395/299 |
| 5,450,559 | 9/1995 | Begun et al. | 395/403 |
| 5,452,432 | 9/1995 | Macachor | 395/842 |
| 5,485,584 | 1/1996 | Hausman et al. | 395/842 |
| 5,493,687 | 2/1996 | Garg et al. | 395/800.23 |
| 5,497,501 | 3/1996 | Kohzono et al. | 395/849 |
| 5,530,902 | 6/1996 | McRoberts et al. | 395/848 |
| 5,594,723 | 1/1997 | Inoue et al. | 395/842 |

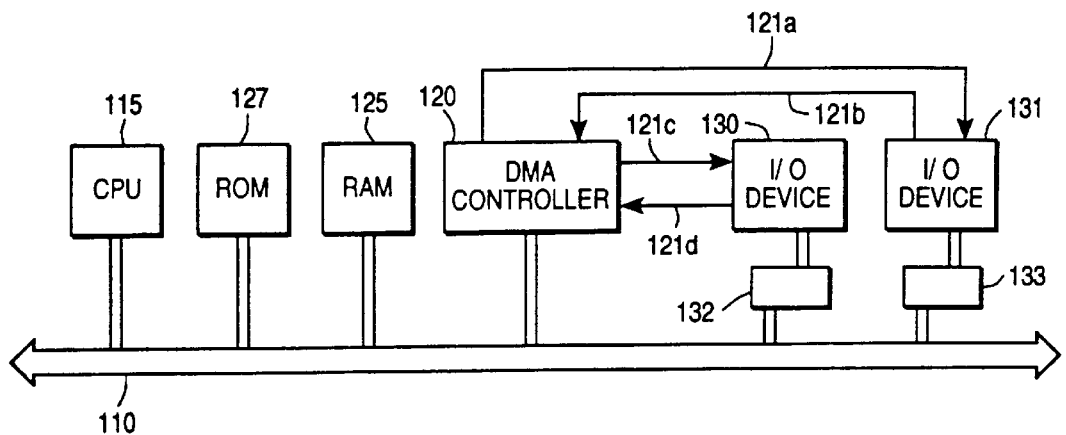
FIG_1A (PRIOR ART)
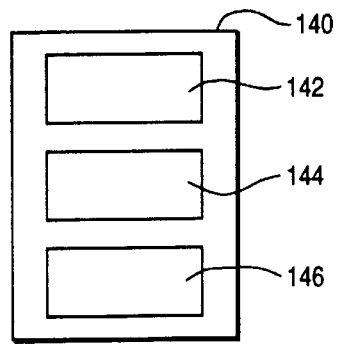
FIG_1B (PRIOR ART)
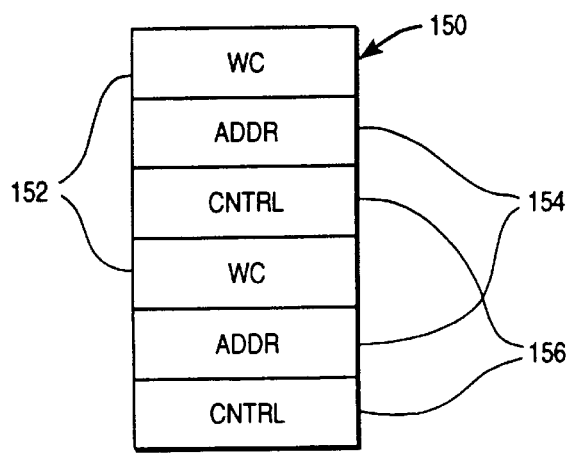
FIG_1C (PRIOR ART)

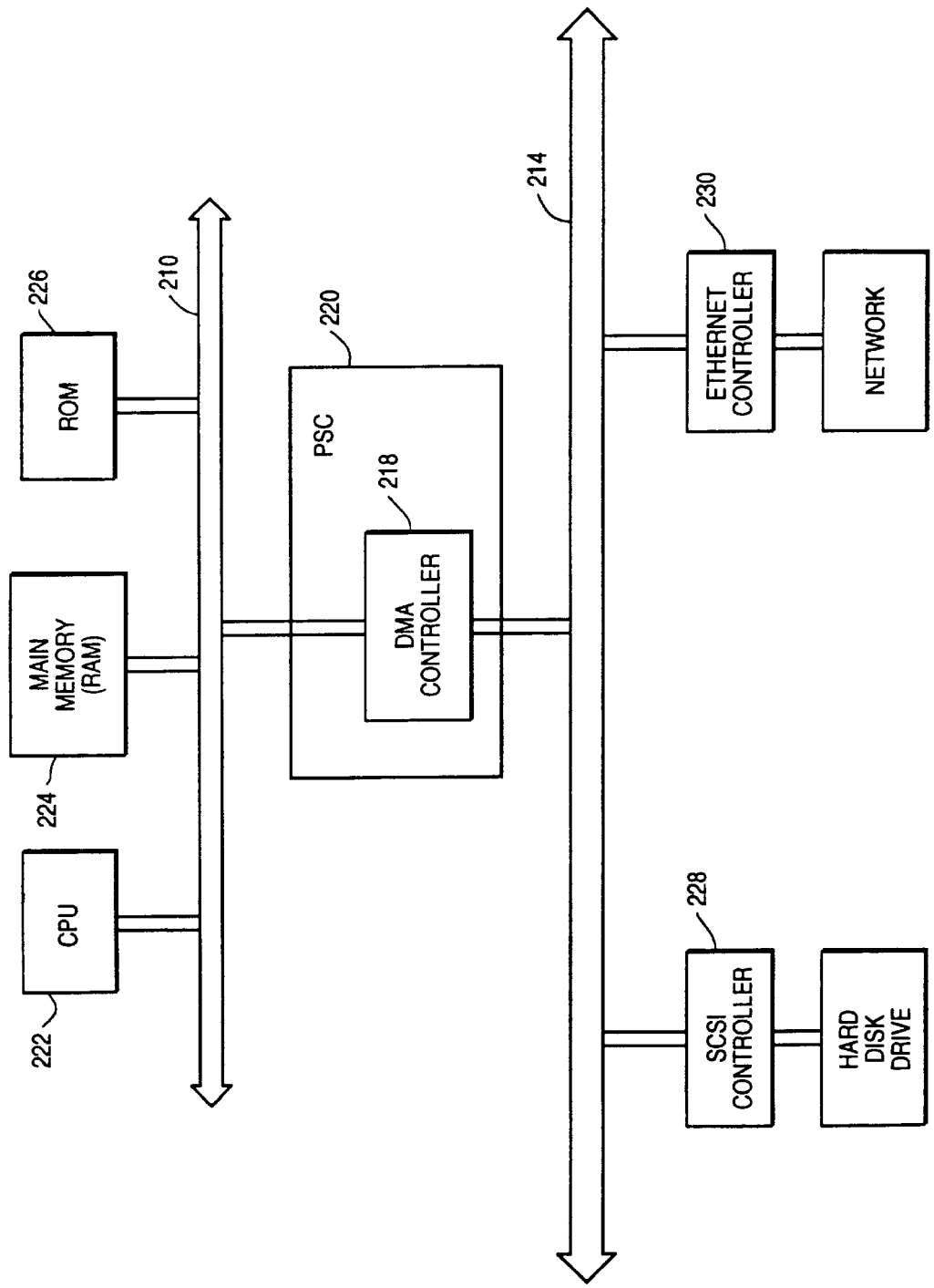
FIG_2A

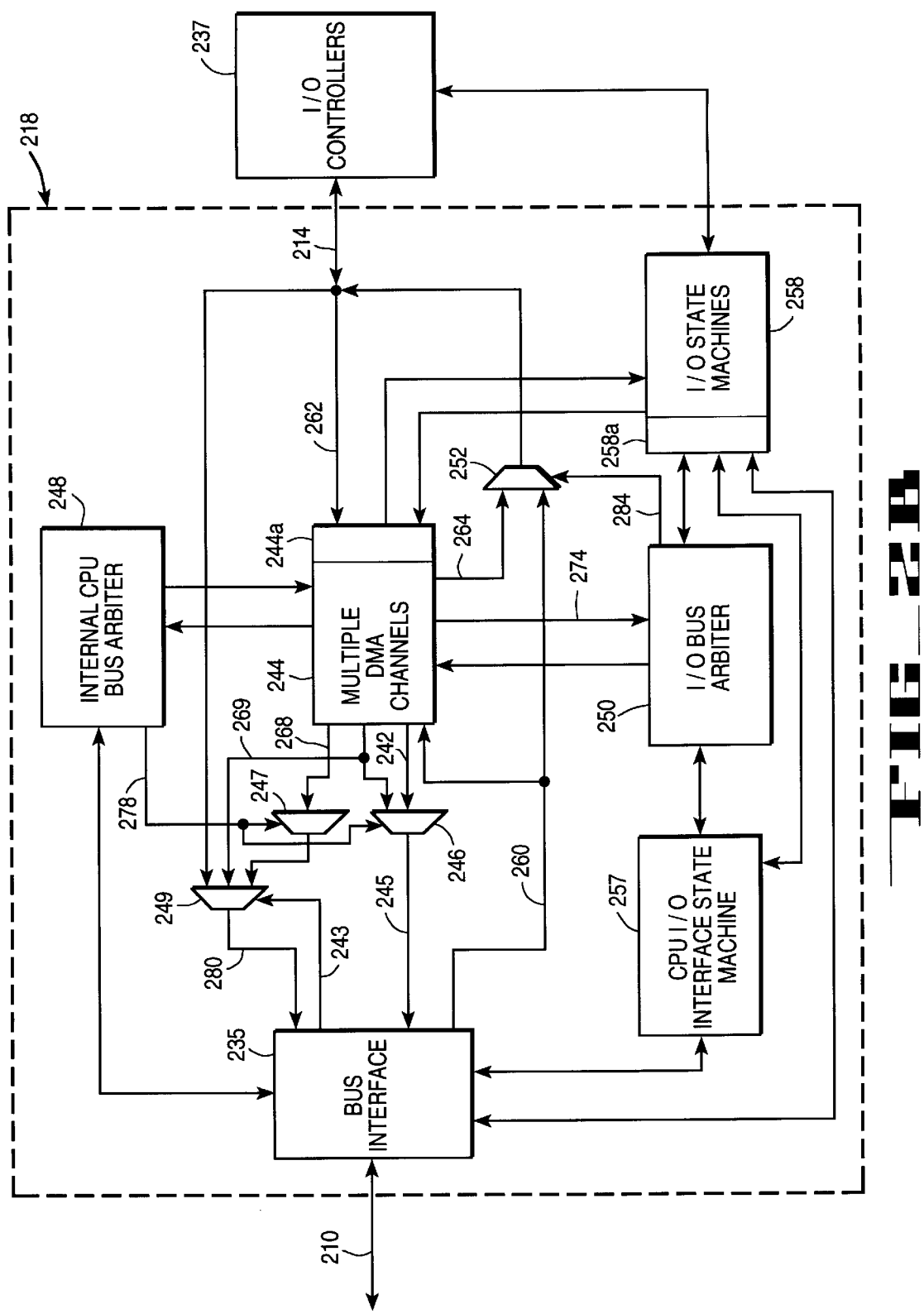
FIG_2B

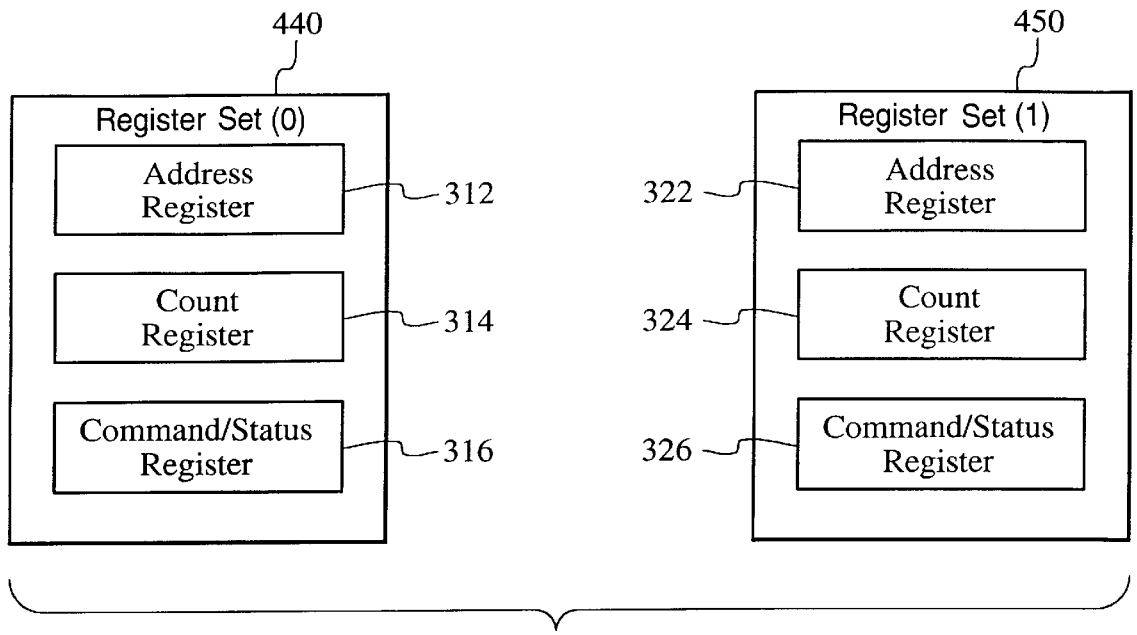
FIG. 3B
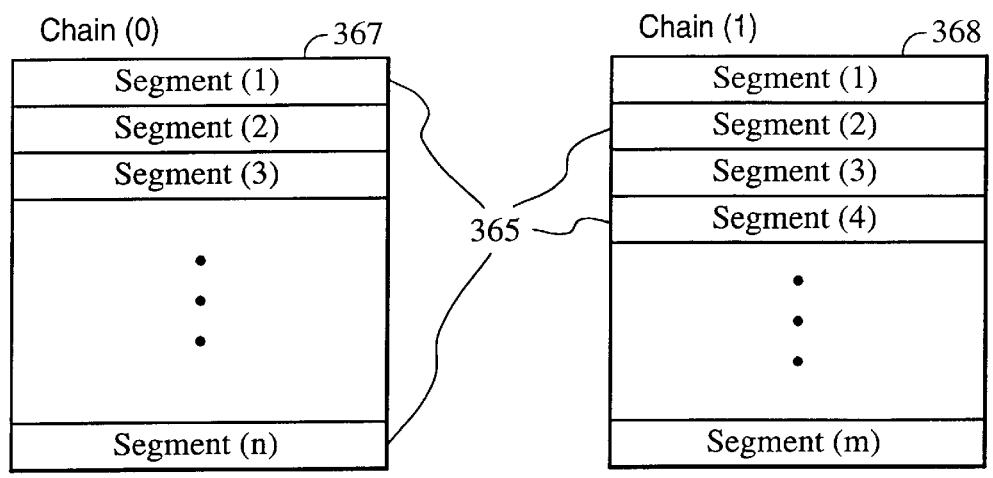
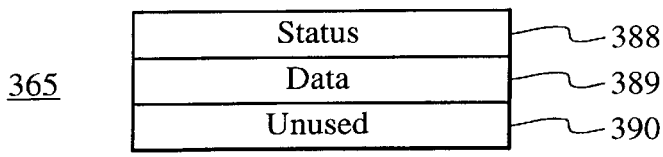
FIG. 3C

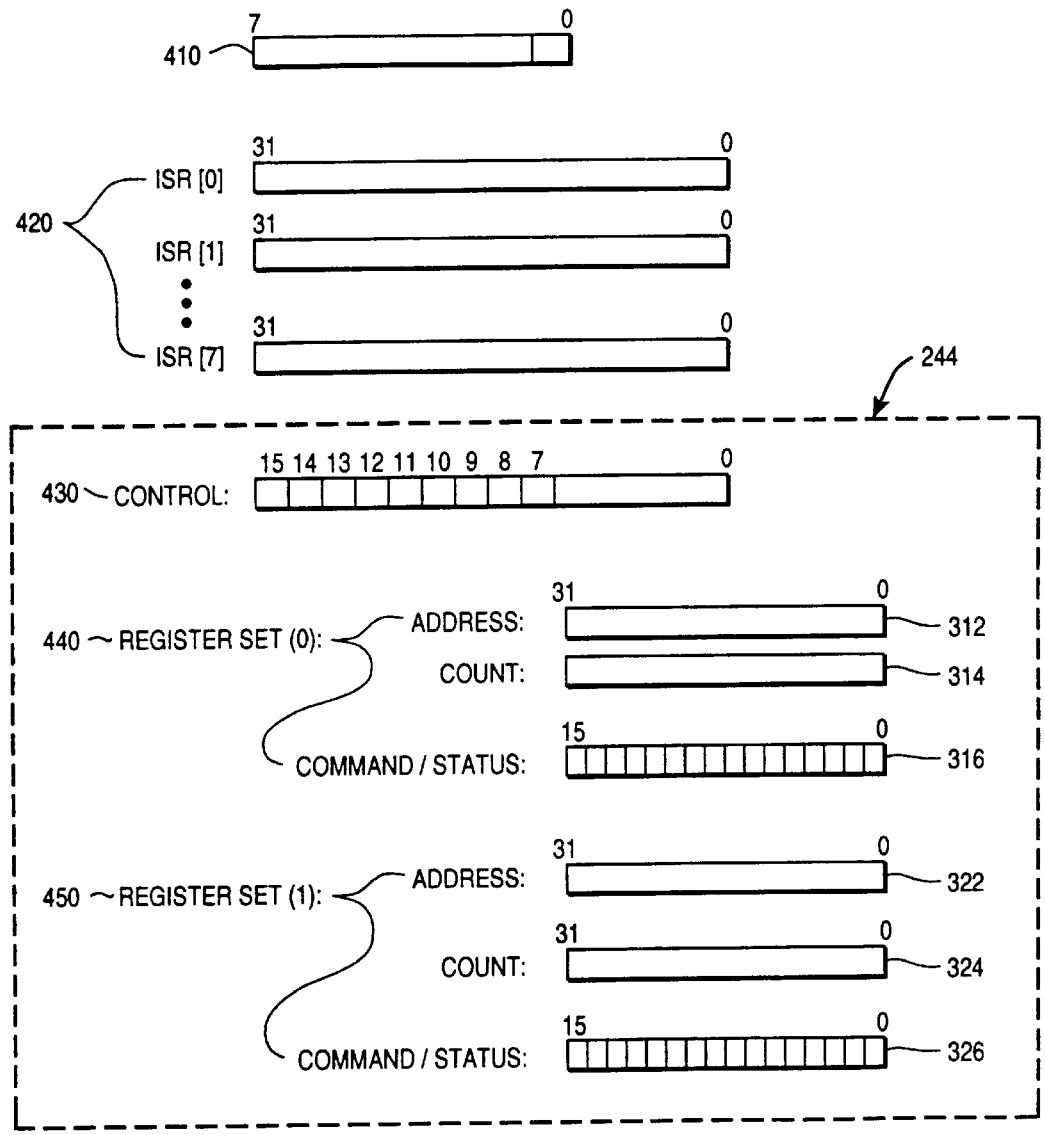
FIG_4

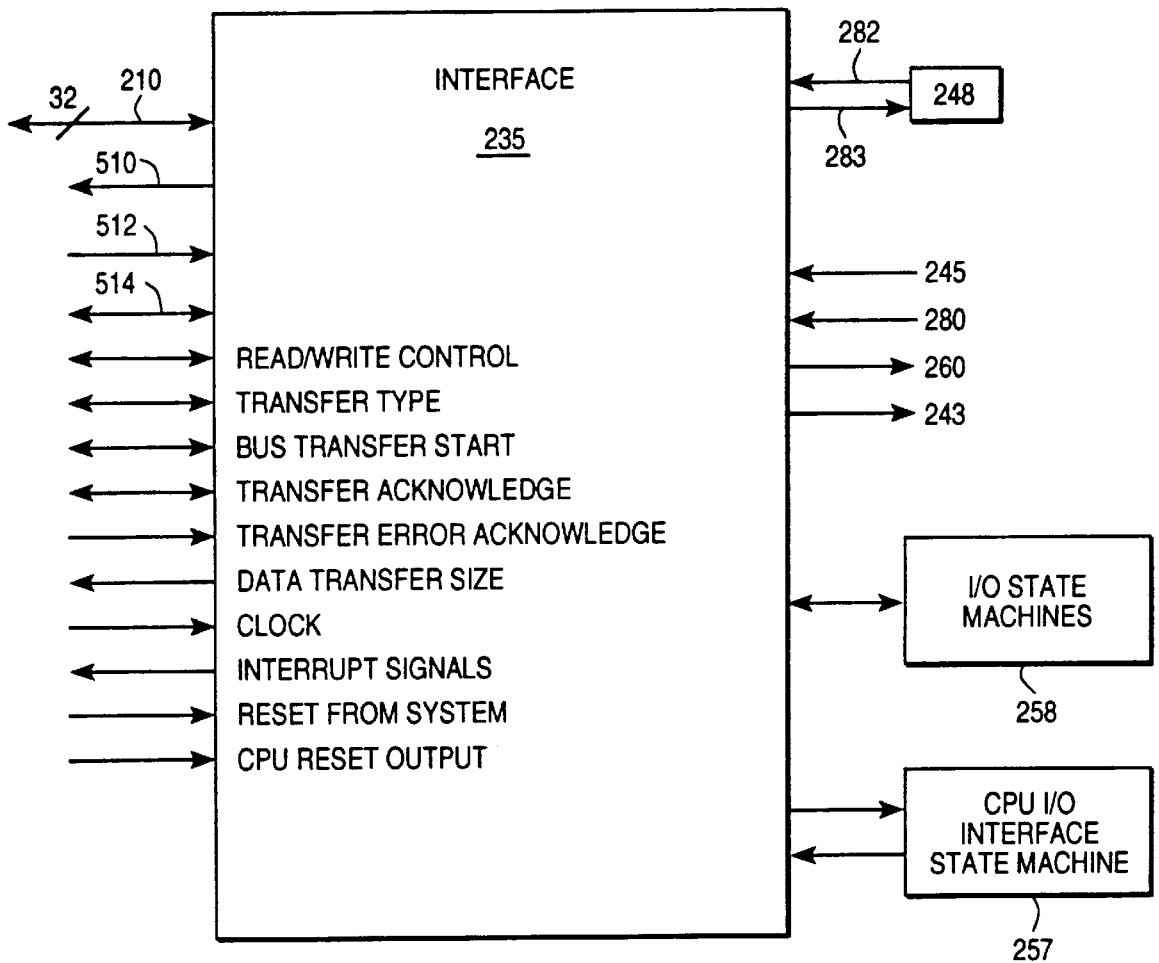
FIG_5

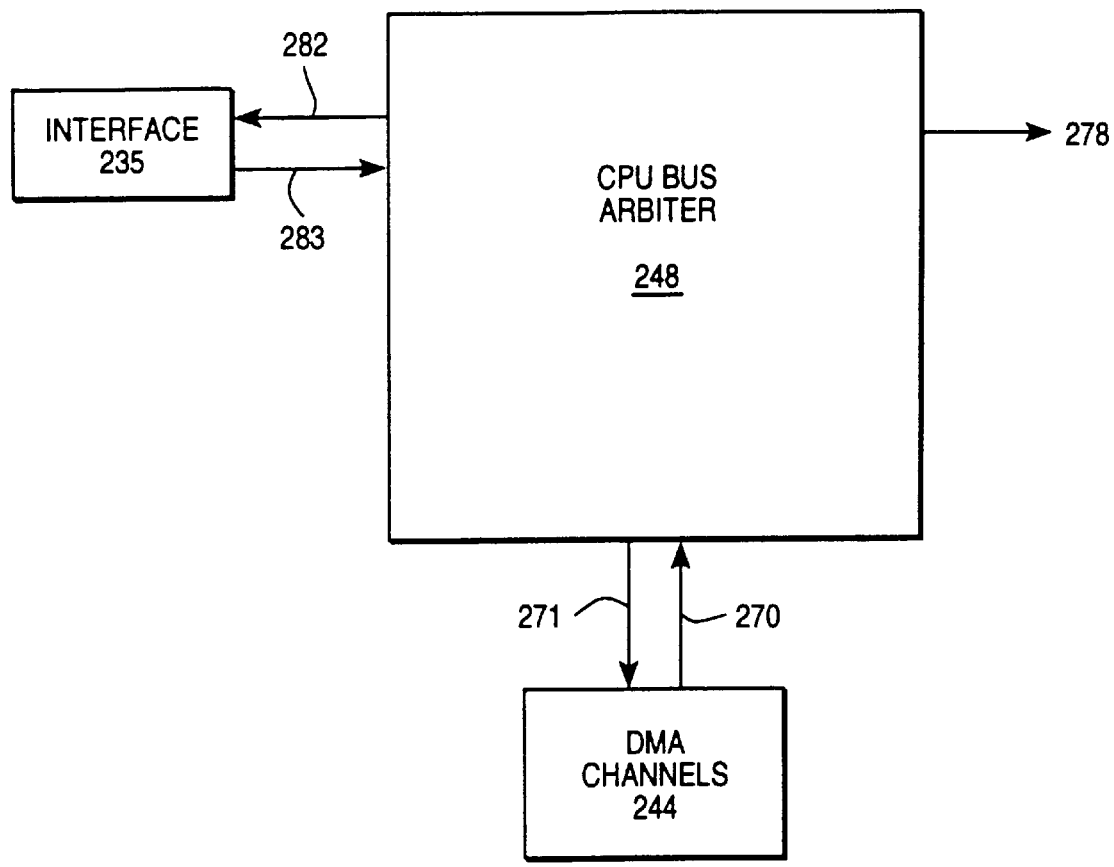
FIG_6

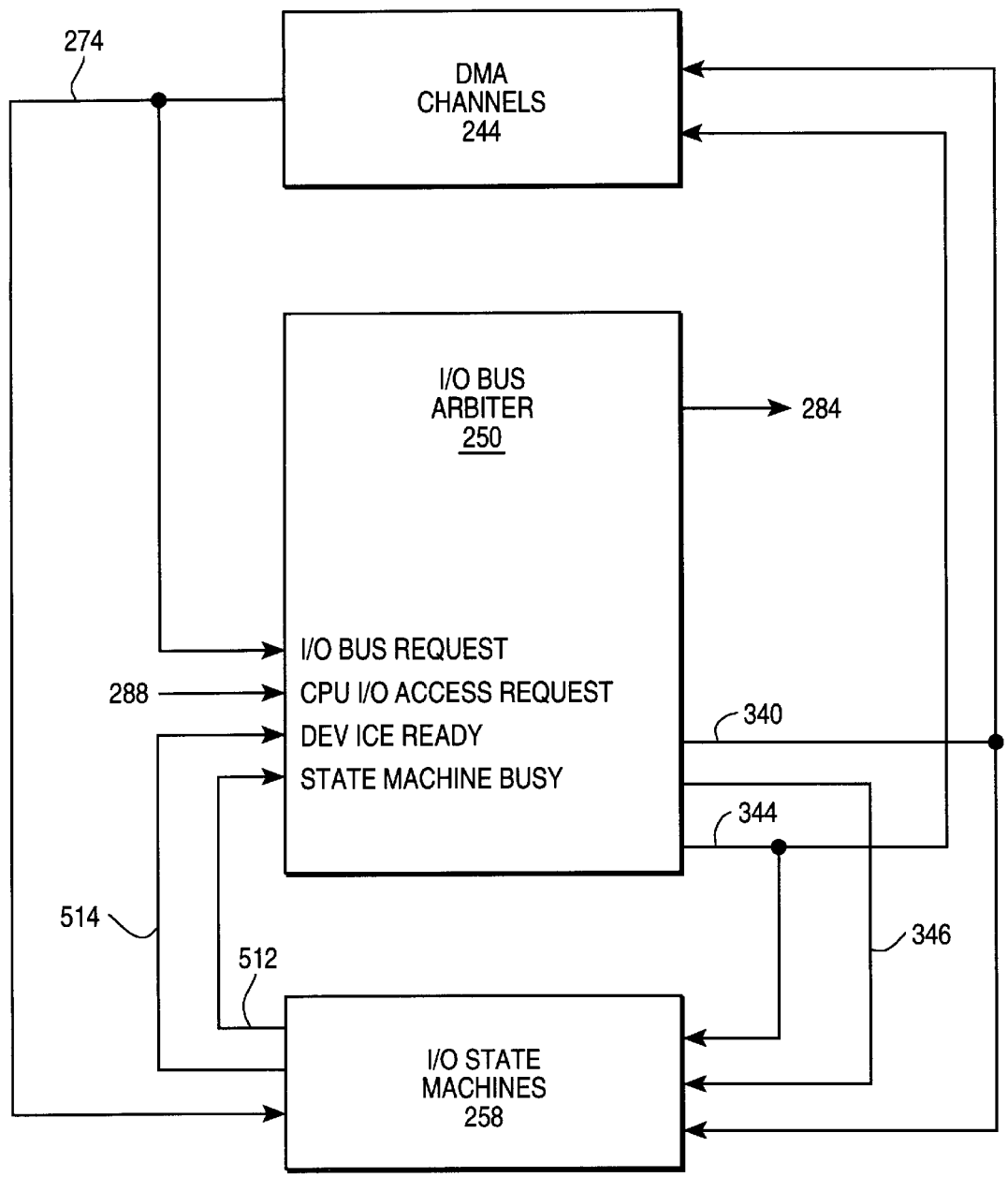
FIG_7A

258

DIRECT MEMORY ACCESS CHANNEL ARCHITECTURE AND METHOD FOR RECEPTION OF NETWORK INFORMATION

This is a continuation of application Ser. No. 08/610,672, filed Mar. 4, 1996 now abandoned, which is a continuation of application Ser. No. 08/189,131, filed Jan. 28, 1994, abandoned.

BACKGROUND OF THE INVENTION

RELATED APPLICATIONS

This application is related to application Ser. No. 08/189,139, entitled "Dual Bus Concurrent Multi-Channel Direct Memory Access Controller and Method", and application Ser. No. 08/189,132, entitled "Multiple Register Set Direct Memory Access Channel Architecture and Method", each of which is assigned to the assignee of the present application and filed concurrently herewith.

FIELD OF THE INVENTION

The present invention pertains to the field of data transfer in a digital computer system. More particularly, this invention relates to direct memory access in a digital computer.

BACKGROUND

In a computer system, direct memory access (DMA) is used to transfer data between input/output (I/O) devices and the main memory of the system. In some systems, DMA is also used to move data from one location in main memory to another. DMA is achieved through a DMA controller which manages the transfer, thereby alleviating the central processing unit (CPU) of the task. That is, the DMA controller is capable of receiving data from I/O devices and issuing the requisite write commands to store the data in main memory and is also capable of issuing the requisite read commands to read data from main memory and then transferring it to a particular I/O device. The DMA controller therefore allows the CPU to perform other tasks while the DMA controller is transferring the data.

One common way of implementing DMA is shown in FIG. 1A. A block diagram of a computer system is shown with a system bus 110 connected to a CPU 115, a DMA controller 120, a main memory (which may be random access memory—RAM) 125, a Read Only Memory (ROM) 127, and two I/O devices 130 and 131 through bus interface logic 132 and 133. The DMA controller 120 is also coupled to the I/O devices 130 and 131 over control lines 121a, 121b, 121c and 121d. System bus 110 is shared by the DMA controller 120 and the CPU 115. Therefore, CPU 115 may be forced to sit idle while DMA controller 120 is using system bus 110 to transfer data between main memory 125 and the I/O devices 130 and 131.

FIG. 1A illustrates a typical prior art fly-by DMA scheme. In a fly-by DMA scheme the DMA controller 120 manages the data transfer, however the data does not pass through the DMA controller. The DMA controller 120 issues the read and write commands necessary to transfer the data between the I/O device and main memory. The controller 120 does not actually "see" any of the data being transferred, the data passes by on system bus 110 on its way to main memory 125 or I/O device 130 or 131. In some prior art systems a buffer may be situated between the system bus 110 and each I/O device 130 and 131, or a buffer may be contained within main memory 125. This buffer may act as an intermediary between the system bus 110 and the particular I/O device (e.g. as a transition from 16-bit to 32-bit), or may temporarily store the data before it is written to its destination (either main memory 125 or an I/O device 130 or 131). This buffer, however, is not part of the DMA controller; the data is transferred to the buffer after being transferred over the system bus 110.

A typical prior art fly-by DMA controller contains a single register set, shown in FIG. 1B. The register 140 consists of a counter 142, an address register 144, and may have a control register 146. The counter 142 is programmed by the CPU 115 prior to a DMA transfer with the amount of data to be transferred, usually a number of bytes. The address register 144 is programmed by the CPU 115 prior to a DMA transfer with the beginning location for the transfer (either where the first data byte to be read from main memory is located or where the first byte is to be written in main memory). The control register 146 may be included and if so contains necessary control information pertaining to a transfer. The DMA transfer begins after counter 142 and address register 144 are programmed. As data is transferred by the DMA controller 120, the counter 142 is decremented so that it contains the amount of data remaining to be transferred and the address register 144 is updated to hold the memory address of the next byte to be read or written.

Another prior art implementation of a DMA controller is a linked list 150 shown in FIG. 1C. The linked list 150 is stored in main memory 125 and may contain multiple control structures 156; the linked list 150 is programmed by the CPU 115 with multiple counts 152 and multiple addresses 154. The linked list 150 allows CPU 115 to program multiple transfers, thereby allowing DMA controller 120 to make multiple DMA transfers without stopping to be reprogrammed by CPU 115. However, the use of a linked list 150 has significant drawbacks. Among the most significant of these drawbacks is the increased control and complexity required in the DMA controller. Due to the nature of a linked list, the location of the count 152 and address register 154 for the current transfer will change after each transfer. The DMA controller 120 therefore requires additional control logic, and therefore additional hardware complexity, to keep track of these constantly changing locations, and to access their values in main memory 125.

SUMMARY AND OBJECTS OF THE INVENTION

In view of limitations of known systems and methods, one of the objectives of the present invention is to provide a direct memory access (DMA) controller and method to reduce CPU interrupt latency restrictions.

Another objective of the present invention is to provide a DMA controller and method capable of receiving multiple ethernet packets without CPU intervention.

Another objective of the present invention is to provide a DMA controller and method of storing multiple ethernet packets in a form that is easily interpreted by the software driver.

These and other objects of the invention are provided for by a direct memory access channel architecture and method for reception of ethernet packets. The DMA controller is connected to the CPU bus of a computer system through a bus interface. The DMA controller is also connected to an I/O bus, which is coupled to one or more I/O devices, including an ethernet network. Multiple channels, each corresponding to a particular I/O device, are contained within the DMA controller and are connected to both the bus interface and the I/O bus.

The DMA controller controls DMA transfers between the I/O devices and the main memory of the system. The ethernet receive channel within the DMA controller contains multiple register sets and a first in first out (FIFO) buffer; each register set comprises a count register, an address register, and a command/status register. The count registers store the number of packets to be received for a particular DMA transfer. The address registers are initially programmed with the starting location for the transfer in main memory and correspond to the first segment within a chain of segments in contiguous physical memory. During a transfer, the address registers are updated to contain the location where the next quad longword of the incoming ethernet packet will be written in memory. Each command/status register stores control information for its register set and the FIFO buffer stores a portion of the data being transferred between the two buses.

Prior to a DMA ethernet receive transfer, the computer software programs the count and address registers of one register set with the requisite information for the transfer. If a second transfer is required, the software may also program a second register set at this time with the count and address information for the second transfer. Once a register set is programmed, and when the previously programmed transfer is completed, the register set will become the active register set and will attempt to begin its transfer. The DMA channel's transfer of data will depend on what other channels are requesting access to the bus this DMA channel is requesting access to, and the ability of the DMA channel's corresponding I/O device to accept or provide data.

BRIEF DESCRIPTION OF THE DRAWINGS

The present invention is illustrated by way of example and not limitation in the figures of the accompanying drawings, in which like references indicate similar elements and in which:

FIG. 1A is a block diagram of a prior art implementation of direct memory access (DMA) in a computer system;

FIG. 1B is a diagram of a prior art single register implementation of a DMA controller;

FIG. 1C is a diagram of a prior art linked list data structure of a DMA controller;

FIG. 2A is a block diagram of a general computer system utilizing the DMA controller of the present invention;

FIG. 2B is a diagram of the DMA controller of the preferred embodiment of the present invention;

FIG. 3B is a diagram showing the chains of segments in physical memory of the preferred embodiment of the present invention;

FIG. 3C is a diagram showing an example segment within a chain of the preferred embodiment of the present invention;

FIG. 4 is a diagram of the registers in the direct memory access controller of the preferred embodiment of the present invention;

FIG. 5 is a diagram of the CPU bus interface of the preferred embodiment of the present invention;

FIG. 6 is a diagram of the internal CPU bus arbiter of the preferred embodiment of the present invention;

FIG. 7A is a diagram of the I/O bus arbiter of the preferred embodiment of the present invention.

DETAILED DESCRIPTION

Figure 3A:
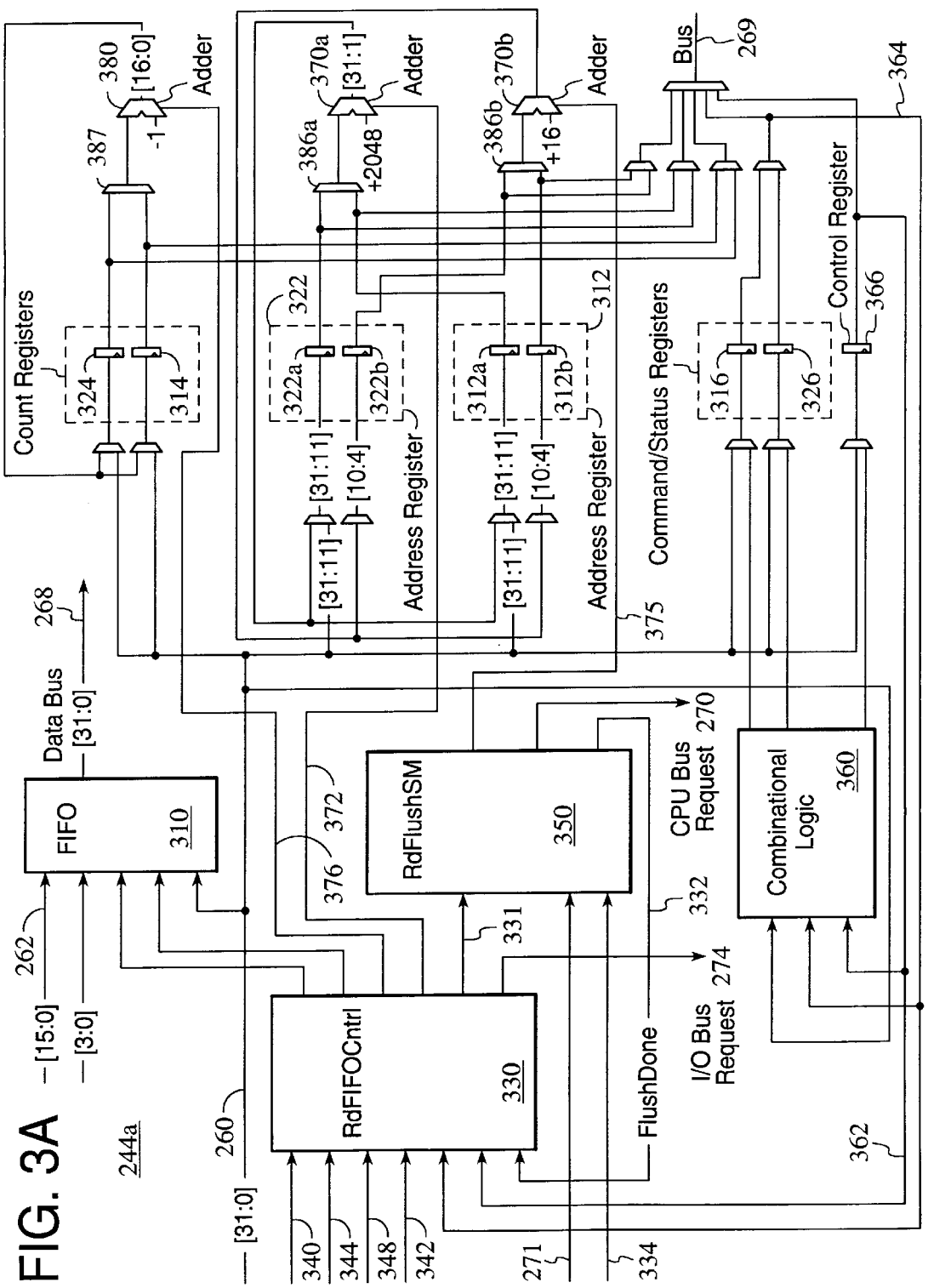
FIG. 3A is a diagram of an example single DMA channel within the direct memory access controller of the preferred embodiment of the present invention.

In the following detailed description of the present invention numerous specific details are set forth in order to provide a thorough understanding of the present invention. However, it will be obvious to one skilled in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One embodiment of the preferred embodiment of the present invention comprises a direct memory access (DMA) controller containing a receive channel with two register sets for reception of ethernet packets. However, it should be realized that the present invention is not limited to such a controller and applies equally to other multiple register set channels, such as a triple register set channel or reception of other types of network information.

FIG. 2A shows a block diagram of a general computer system utilizing the direct memory access (DMA) controller 218 of the present invention. In the preferred embodiment of the present invention the DMA controller 218 is contained within a peripheral subsystem controller (PSC) 220. The PSC 220 controls the access between the central processing unit (CPU) bus 210 and the input/output (I/O) bus 214. The DMA controller 218 of the present invention controls the DMA transfer portion of this access and part of the non-DMA transfers. The PSC 220 will not be discussed further, except as it relates to the DMA controller 218 of the present invention.

The computer system contains two buses: the CPU bus 210 and the I/O bus 214. The CPU bus 210 of the preferred embodiment is a subset of a Motorola 68040 bus; the 68040 bus comprises a 32 bit address bus, a 32 bit data bus, and a control bus. The I/O bus 214 of the preferred embodiment comprises a 16 bit data bus, a 5 bit address bus, and a control bus. However, it should be readily apparent to those of ordinary skill in the art that the present invention may be utilized with any of a wide variety of commercially available busses.

Multiple I/O controllers are coupled to the I/O bus 214; for example, a SCSI controller 228 connected to a hard drive and an Ethernet controller 230 connected to a network may be connected to the I/O bus 214. The CPU bus 210 is coupled to multiple standard computer components, namely the CPU 222, a main memory (such as random access memory—RAM) 224, and a read only memory (ROM) 226. Multiple other components (not shown) may also be connected, such as a display device for displaying information to the computer user, an alphanumeric input device including alphanumeric and function keys for communicating information and command selections to the CPU, a cursor control device for communicating user input information and command selections to the CPU, or a stylus and tablet for communicating information representative of handwriting to the CPU. Alternatively, devices such as the alphanumeric input device, the cursor control device, and the stylus and tablet may be connected to the CPU bus 210 through a specialized port on the PSC 220. The DMA controller 218 is coupled to both the CPU bus 210 and the I/O bus 214. The DMA controller 218 manages the transfer of data between the two buses 210 and 214.

The multiple register set DMA controller 218 is shown in more detail in FIG. 2B. The controller 218 is shown connected to the CPU bus 210 on one side and the I/O bus 214 on the other side. The I/O bus 214 is shown connected to multiple I/O controllers 237, one of which is ethernet controller 230 shown in FIG. 2A. These controllers 237 are further connected to multiple I/O devices (not shown), and include a collection of special signals that augment the I/O bus 214 in communicating with the I/O devices. This connection between I/O controllers and I/O devices is well known in the art and will not be described further. In the preferred embodiment, the ethernet controller 230 is the AMD MACE (Media Access Controller for Ethernet).

The CPU bus 210 is connected to the controller 218 through CPU bus interface 235. Interface 235 is coupled to the I/O multiplexer 252 through bus 260, the internal CPU bus arbiter 248, the internal CPU bus multiplexer 249 through internal CPU bus 280 and control line 243, the DMA transaction description multiplexer 246 over bus 245, the CPU I/O interface state machine 257, and the state machines 258. The interface 235 permits access between the CPU bus 210 and the I/O bus 214 either through the DMA channels 244 or directly (thereby essentially transforming the DMA controller into a bridge between the buses 210 and 214).

The DMA controller 218 contains multiple DMA controller channels 244, including the ethernet receive channel 244(a). These channels are shown as a single block in FIG. 2B so as not to unnecessarily clutter the figure. It should be noted that the DMA controller 218 contains separate channels for receiving ethernet packets and transmitting ethernet packets. The multiple register set architecture of the channels 244 is described in more detail below.

Ethernet receive channel 244(a) contains a first in-first out (FIFO) buffer which provides for data input from the I/O bus 214. Each channel 244 of the DMA controller 218 is connected to the internal CPU bus multiplexer 249, the DMA data multiplexer 247, and the DMA transaction description multiplexer 246. Multiplexers 246, 247 and 249 allow only one channel 244 access to the interface 235 at any given moment.

Internal CPU bus multiplexer 249 receives as input data from I/O bus 214, bus 269, and DMA data multiplexer 247. Multiplexer 249 is controlled by control line 243 from bus interface 235. Interface 235 determines which input to multiplexer 249 should be given access to the internal CPU bus 280, and thus the CPU bus 210. When interface 235 is acting as a bus master, i.e., performing a DMA transfer, on CPU bus 210, multiplexer 249 will allow the data on bus 268 of the appropriate channel (as determined by multiplexer 247, discussed below) access to the internal CPU bus 280. When interface 235 is acting as a bus slave, i.e., the values in its channels' registers are being read from or written to, multiplexer 249 will allow one of the buses 269, described in more detail below, to have access to the internal CPU bus 280. The bus 269 which should be given access to internal CPU bus 280 is determined by interface 235; that is, interface 235 will select the proper bus 269 based on decoding the address presented to interface 235 for the slave access. Additionally, when the DMA controller 218 is acting as a bridge for CPU 222 to directly access I/O bus 214, multiplexer 249 will allow I/O bus 214 to have access to internal CPU bus 280.

The internal CPU bus arbiter 248 controls DMA data multiplexer 247 and DMA transaction description multiplexer 246. Multiplexer 247 receives as input a bus 268 from each channel 244, and is controlled by control line 278. The internal CPU bus arbiter 248 determines which channel 244 should be given access to the interface 235, as discussed in more detail below. After making that determination, CPU bus arbiter 248 asserts the proper signal over control line 278, thereby causing multiplexer 247 to allow the bus 268 from the channel 244 which won the arbitration to be input to multiplexer 249.

Multiplexer 246 receives as input from each DMA channel 244 a bus 269 and transaction description information 242. Similar to multiplexer 247, multiplexer 246 is controlled by internal CPU bus arbiter 248, and thus allows the bus 269 from the DMA channel 244 which won the arbitration access to bus 245. Transaction description information 242 is output from each channel 244 and contains information such as the size of the buffer 310 within that particular channel and whether the channel is currently programmed for a read or a write (as determined by the DIR bit of the channel's active register set, discussed in more detail below, which is always programmed for read in the ethernet receive channel).

Note that the internal CPU bus 280 is distinct from the CPU bus 210; the internal CPU bus 280 is contained wholly within the DMA controller 218 and can access the CPU bus 210 only through the bus interface 235.

Each channel 244 is also connected to the I/O multiplexer 252, which allows only one channel 244 access to the I/O bus 214 at any given moment. The I/O bus arbiter 250 determines which channel 244 should be given access to the I/O bus 214, as discussed in more detail below. Thus, these connections allow data to be transferred between the FIFO of each channel 244 and both the CPU bus 210 and the I/O bus 214.

Each channel 244 is also connected to an I/O state machine 258. Each I/O state machine 258 corresponds to one of the I/O controllers 237. Each state machine 258 is connected to and drives its corresponding I/O controller 237, and therefore also drives the I/O device connected to its corresponding I/O controller 237. The interaction between the state machines 258 and the channels 244 is described in more detail below.

Each DMA controller channel 244 corresponds to a single I/O controller 237. Thus, ethernet receive channel 244(a) corresponds to ethernet controller 230. Whenever data is DMA received from ethernet controller 230, it will be transferred through ethernet receive channel 244(a). Similarly, each DMA controller channel 244 corresponds to a particular I/O state machine 258 (the same state machine 258 which corresponds to the channel's corresponding I/O controller 237). It should be noted that the number of DMA channels 244 and I/O controllers 237 need not be identical—multiple channels 244 may exist for which no corresponding I/O controller 237 is connected to I/O bus 214. It should also be noted that although each DMA channel 244 corresponds to a particular I/O state machine 258, each state machine 258 may correspond to multiple DMA channels 244. Thus, for example, the ethernet receive channel and the ethernet write channel may both correspond to the same ethernet I/O state machine 258. Each controller 237 may have an I/O device connected to it, e.g. a hard disk drive attached to SCSI controller 228 of FIG. 2A, which is well known in the art.

Each channel 244 is also connected to a 32-bit bus 269 which is connected to multiplexers 246 and 249. Each bus 269 carries the address in main memory 224 which the data in FIFO 310, shown in FIG. 3A, will be written to during a DMA read operation or read from during a DMA write operation for its corresponding channel. Bus 269 may also carry the values within the control register 366, the command/status registers 316 and 326, or the values in the count registers 314 and 324 of a particular channel, as shown in FIG. 3A.

When the DMA controller 218 is receiving a packet of data from the ethernet controller 230 and transferring it to main memory 224 ethernet receive channel 244(a), using the values in its active register set, first requests access to the I/O bus 214 from arbiter 250. The request is eventually granted, and channel 244(a) retrieves a portion of the data from the I/O controller 230 over the I/O bus 214 and stores this portion in the channel's FIFO buffer. When the FIFO buffer is full (or no more data needs to be transferred), channel 244(a) requests, and is eventually granted, access to the internal CPU bus 280 and bus 245. The bus interface 235 then requests, and is eventually granted, access to the CPU bus 210 of the computer system. The interface 235 will then transfer the contents of the FIFO buffer of ethernet receive channel 244(a) to main memory 224 over the CPU bus 210 of the computer system. After this portion of the transfer is complete, channel 244(a) will again request access to the I/O bus 214 if the overall transfer programmed by the CPU is not complete.

Other DMA channels may also perform a write operation (i.e., a transfer from main memory to an I/O controller). In these cases, the DMA controller 218 works in reverse of the read operation above. First, the DMA channel 244 requests access to the internal CPU bus 280; once the interface 235 is granted access to the CPU bus 210 of the computer system the channel 244 will transfer a portion of the data in main memory 224 into its FIFO buffer over bus 260. After the transfer of this portion is complete, the channel 244 requests access to the I/O bus 214 from the I/O bus arbiter 250. Once access is granted, the channel 244 transfers the data in its FIFO buffer to the I/O controller. Then, if additional data to be transferred remains in main memory 224, the channel will repeat the process. The ethernet receive channel architecture of the present invention does not perform write operations (transfers from main memory to the ethernet controller); thus, write operations will not be discussed further.

When ethernet receive channel 244(a) has completed the transfer that the currently active register set is programmed for, channel 244(a) will switch register sets, thereby making the second register set the active register set. If the second register set has been programmed and is ready to begin a transfer, it will attempt to begin its transfer, following the steps described above.

The use of a multiple register set architecture, as described above, allows the DMA controller 218 to chain two transfers together. That is, each register set can be programmed for a transfer and the transfer for the second register set will begin immediately following the completion of the first register set's transfer. Furthermore, if the first register set's transfer can be serviced quickly enough, the first register set can be programmed for a third transfer, which will begin immediately upon completion of the second register set's transfer. Thus, an infinite number of transfers could be chained together if the completed transfer can be serviced before the completion of the current transfer.

CPU Bus Interface

FIG. 5 shows CPU bus interface 235 in more detail. Interface 235 is the interface between the CPU bus 210 and the DMA controller 218. Interface 235 is connected to the internal CPU bus arbiter 248 over control lines 282 and 283. This connection and the function of the arbiter 248 are described in more detail below.

Interface 235 is connected to CPU bus 210 and controls the DMA controller's requests for access to CPU bus 210. Interface 235 contains an address decoder (not shown) which decodes the input address from bus 210. The address decoder is needed in the preferred embodiment in order to provide access to the proper I/O controller and the register sets. It should be noted that address locations in main memory 224 which are programmed in the DMA channels 244 must be physical locations; the interface 235 does not translate addresses when transferring data from the channels 244 to main memory 224.

When interface 235 receives a request for the CPU bus 210 from the internal CPU bus arbiter 248, interface 235 will request access to the CPU bus 210 from the CPU bus arbiter (not shown). One such arbiter is described in more detail in copending U.S. patent application Ser. No. 08/189,138, entitled "Memory Bus Arbiter for a Computer System Having a DSP Co-processor", invented by Michael J. Bowes and Farid A. Yazdy, assigned to the assignee of the present invention and filed concurrently herewith. However, access to the CPU bus 210 may also be controlled in a well known manner using a conventional CPU bus arbiter.

Interface 235 has three control lines 510, 512, and 514 which carry the signals controlling whether interface 235 will be permitted to act as a bus master on the CPU bus 210. When interface 235 requests access to the bus 210 it does so by asserting a bus request signal over control line 510. Interface 235 must then wait to access the bus 210 until it is not receiving a bus busy signal and it receives a bus grant signal. The interface 235 receives a bus busy signal over control line 514 whenever another device on the bus 210 is using the bus. When the CPU bus arbiter grants the DMA controller access to the CPU bus 210, the CPU bus arbiter will send a bus granted signal to interface 235 over control line 512; interface 235 will then assert a bus busy signal over control line 514, thereby notifying other devices on bus 210 that the bus is in use. After being granted access to the CPU bus 210 and completing the access, interface 235 will assert an "access done" signal to the internal CPU bus arbiter 248 and the DMA channel 244 over control line 283. The DMA channel may then proceed with its data transfer, as described below.

Several additional control signals are also shown connected to interface 235. These signals are used in controlling transfers to and from the interface 235 over the CPU bus 210. The use of these signals in transferring data between memory and other devices is well known in the art and will not be discussed further. Interface 235 also receives two 32-bit bus lines 245 and 280 from the multiplexers 246 and 249. The multiplexers 246 and 249 are coupled to each DMA channel 244, as described above.

Interface 235 also outputs a bus 260 to multiplexer 252 of the DMA controller 218. Bus 260 is used to transfer data from the CPU bus 210 directly to the I/O bus 214. When the CPU 222 is given access to the I/O bus 214, as discussed below, data will flow from the interface 235 directly to the I/O bus 214 over bus 260, thereby bypassing the DMA channels 244. Similarly, data being returned to the CPU bus 210 when the CPU 222 is given access to the I/O bus 214 will flow from the I/O bus 214 through multiplexer 249 and internal bus 280 back to interface 235. Thus, data can be read directly from the I/O devices, bypassing the DMA channels 244.

Ethernet Receive Channel Register Sets

Turning to FIG. 3A, each register set includes an address register, count register and a command/status register. Command/status registers 316 and 326 are referred to as "command registers" when they are being written to and "status registers" when they are being read from. The information stored in these registers is described in detail below.

Each register set is also associated with one chain 367 and 368 of segments 365 in main memory 224, as shown in FIG. 3C. Each chain is one contiguous block in physical memory; i.e., the chains are not a linked list of segments. The placement of the chains in contiguous blocks of physical memory allows the DMA controller 218 to write data into the memory block up to the value in its count registers by merely updating the address register of the currently active register set. That is, the DMA controller 218 must increment the address register, however it does not need to keep track of a linked list's location in main memory 224, thereby reducing the hardware complexity of the present invention.

Each chain 367 and 368 consists of up to 1023 segments 365. The maximum chain length exists because the count register 314 and 324 in the preferred embodiment of the present invention may be programmed to a maximum of 1023, as discussed below. However, it should be readily apparent to those of ordinary skill in the art that although a maximum chain length exists, multiple chains may be set up consecutively in main memory 224, thereby creating a physical block of memory limited only by the size of main memory 224. It should also be readily apparent that the maximum value of 1023 is an implementation specific detail, and could easily be larger or smaller.

Each segment 365 in the preferred embodiment of the present invention consists of 2 K bytes divided into three portions, shown in more detail in FIG. 3C: a status portion 388, a data portion 389, and an unused portion 390. Status portion 388 is 16 bytes and contains the status information, such as the packet length (generally in bytes) and/or error and status signals, for the packet stored in data portion 389. Data portion 389 is 1518 bytes in the preferred embodiment of the present invention, which is the size of the ethernet packets used in the preferred embodiment of the present invention. Unused portion 390 contains 514 bytes that are not used by the present invention. Note that unused portion 390 may contain more than 514 bytes if the packet received is less than 1518 bytes, however the sum of status portion 388, data portion 389 and unused portion 390 will always be 2048 bytes in the preferred embodiment.

It should be noted that the DMA controller 218 in the preferred embodiment does not take precautions to verify that the packet received is the correct length. If the packet length is greater than 1518 bytes, the controller 218 will store data in excess of the 1518 bytes in the unused portion 390 and then wrap around to the front of the segment 365, rewriting over any data in status portion 388 and data portion 389. Therefore, an erroneously long packet may destroy data previously written to data portion 389. Furthermore, any data written into status portion 388 will be subsequently overwritten when the Receive Frame Status Register information is written, as discussed below.

Address registers 312 and 322 and count registers 314 and 324 are programmed by software prior to a data transfer. A single register set may be programmed at a time, or both may be programmed before the transfer begins. Count registers 314 and 324 are programmed with the number of packets to be received in the transfer. The count register of the preferred embodiment of the present invention may be programmed with a maximum value of 1023, thereby allowing the register to transfer 1023 packets before needing to be reprogrammed. It should be noted that this maximum value may be easily changed by a system designer by simply altering the number of bits in the register.

Address registers 312 and 322 are programmed with the address of the first segment in their respective chains 367 and 368. The 11 low bits of the bus 260 are not connected to register 312 or 322; the 21 higher bits are written into register portion 312a or 322a. This forces the programmed address to be 2 K byte aligned. Whenever the computer system is reset (either by hardware or software), the lower bits in register portions 312b and 322b are initialized to $00000001_2$. This has the affect of loading portions 312b and 322b with the value of 16 because the lowest four bits are hardwired to zero. Thus, when software programs either register 312 or 322, the value programmed will be 2 K byte aligned and the address register 312 or 322 will contain the location of the first data portion 389 of the first segment 365 to be written into memory.

The address registers 312 and 322 are updated after each transfer from the FIFO 310 to main memory 224, as discussed below. The updated addresses indicate the next location in main memory 224 to write to. Similarly, the count registers 314 and 324 are updated after the last byte of a packet has been transferred to main memory 224. The updated count values indicate the number of packets remaining to be transferred. Note that the count registers indicate the number of packets remaining to be transferred to main memory 224; thus, a partially transferred packet will not decrement the count register until it has been completely transferred.

The CPU can perform a slave access to the DMA controller 218, thereby allowing the software to program the controller 218 for a transfer. That is, during a slave access the software can write directly to (or read from) the register sets in any given channel. A series of select signals (not shown) from interface 235 is connected through a set of multiplexers to allow access to each of the registers in controller 218. During a slave access, interface 235 will decode the address received over CPU bus 210 and assert the proper select signals based on this address, thereby allowing software to access the desired registers. During a slave read, the values contained within the requested registers are returned to interface 235 over bus 269 (through multiplexer 249). During a slave write, the values to be written into the specified registers are input from CPU bus 210, through interface 235, to the registers over bus 260.

The ability to perform slave accesses to the DMA controller 218 is required to program the register sets for transfers. In addition, the ability is particularly valuable when the software needs to check on the status of a programmed transfer, or whether a PAUSE has been completed, as indicated by the FROZEN bit, discussed below.

In the case of programming the register sets, upon completing the programming the software will set the ENABLED bit of the programmed register set's command/status register 316 or 326. As described below, this informs Read control 330 to begin a transfer.

FIFO Buffer

FIG. 3A shows ethernet receive channel 244(*a*) in more detail. In the preferred embodiment of the present invention, the FIFO buffer 310 is a pseudo-FIFO buffer. That is, data is transferred through the buffer 310 in a first in-first out manner, however all data is removed from the buffer before any additional data is added. For example, if the buffer 310 is 16 bytes, then during a transfer 16 bytes will be loaded into the buffer and then removed in a first in-first out manner. Additional data will not, however, be added to the buffer 310 until all 16 bytes have been removed. One such buffer is described in more detail in copending U.S. patent application Ser. No. 08/189,141 entitled "Pseudo First-In-First-Out (FIFO) Buffer", invented by Brian A. Childers and Michael J. Bowes, assigned to the assignee of the present invention and filed concurrently herewith. However, it should be apparent to those of ordinary skill in the art that a wide range of FIFO-type buffers could be used as the FIFO buffer 310.

The use of a separate FIFO 310 in ethernet receive channel 244(*a*) serves several important functions. Among these functions is that it allows for concurrent transfers. That is, ethernet receive channel 244(*a*) may be transferring the contents of its FIFO over the CPU bus 210 while at the same time a second channel 244 is loading its FIFO from an I/O controller over I/O bus 214. Furthermore, the FIFO insulates the CPU bus 210 from the slow access times of the ethernet network connected to ethernet controller 230. Data is transferred from the ethernet controller 230 to the FIFO of channel 244(*a*) then, when access to the CPU bus is granted, burst over the CPU bus 210, thereby minimizing the impact of ethernet transfers on the CPU bus 210 bandwidth.

The FIFO 310 of ethernet receive channel 244(*a*) may be of varying size. One embodiment of the present invention utilizes a FIFO of 16 bytes, i.e., equivalent to a quad longword. The size of the buffer is predetermined by the system designer giving weight to several considerations, including the bandwidth of ethernet and the latency requirements of ethernet.

Ethernet receive channel 244(*a*) contains only a single FIFO 310 which is shared by the two register sets. Only one register set is active (i.e., transferring data) at any given moment, as is described in more detail below. Thus, the single FIFO 310 can be shared by the two register sets without conflict.

Ethernet receive channel 244(*a*) is coupled to two 32-bit buses 260 and 268 which are connected to interface 235, as described above. Bus 260 is input to FIFO 310 from interface 235; bus 260 carries data to the register sets for programming the register sets, which is described in more detail below. Similarly, bus 268 carries data from FIFO 310 to CPU bus 210 (through multiplexers 247 and 249, and interface 235) when writing part of a packet to main memory 224.

FIFO 310 is also coupled to 16-bit data bus 262, which is connected to I/O bus 214. Data bus 262 is an input bus which carries data from ethernet controller 230 to FIFO 310 over I/O bus 214 during a receive packet operation.

Read FIFO Control

The set of control lines used for the I/O bus arbitration, discussed in more detail below, are also coupled to the Read FIFO Control 330. The control lines include the I/O bus request signal line 274, the I/O bus busy signal line 344, the I/O bus grant signal line 340, and the I/O access done signal line 348. Read control 330 also receives an end of packet signal over control line 342 from the ethernet controller 230 through I/O state machines 258 when the last byte of the packet has been read into the FIFO 310. This signal is generated by the ethernet controller 230 and is asserted when the last byte of the packet has been transferred.

In addition, Read control 330 also receives input on command/status bus 362 and control bus 364. Buses 362 and 364 are input from control register 366 and command/status registers 316 and 326 respectively. The inputs on buses 362 and 364 provide Read control 330 with the information from registers 366, 316 and 326 necessary to perform the read transfer. The information transferred over these buses is described in more detail below.

Read control 330 may also be connected to the FIFO buffer 310. This connection would allow Read control 330 to send any required control signals to FIFO buffer 310. These control signals will not be described further as the present invention may use any of a wide variety of FIFO buffers.

The I/O bus request signal line 274 is output from Read control 330 to the I/O bus arbiter 250 and is asserted when channel 244(*a*) has been programmed and is ready to transfer data from ethernet controller 230 to its FIFO 310. I/O bus request signal line 274 is also input to the ethernet receive I/O state machine 258(*a*). Read control 330 knows to assert the signal line 274 when the ENABLED bit of the command/status register 316 or 326 of the currently active register set has been set, the channel is not PAUSEd, and the value in the count register 314 or 324 of the currently active register set is greater than zero. It should be noted that the DIR bit of the command/status register 316 or 326 always indicates a read in the preferred embodiment, as channel 244(*a*) only "reads" information from the I/O device to main memory.

Read control 330 will receive a bus busy signal from arbiter 250 over I/O bus busy signal line 344 while the I/O bus is occupied by another transfer. When arbiter 250 does grant channel 244(*a*) access to the I/O bus 214, arbiter 250 will send an I/O bus granted signal to Read control 330 and I/O state machine 258 over I/O bus granted signal line 340. The I/O bus granted signal combined with the I/O bus busy signal being inactive allows the ethernet receive state machine 258(*a*) to transfer two bytes (the size of the I/O bus 214) from ethernet controller 230 to FIFO 310. After transferring these bytes, the ethernet receive state machine 258(*a*) will assert an I/O access done signal over control line 348. Note that in the preferred embodiment the ethernet device is a 16-bit device, however it should be apparent to those of ordinary skill in the art that an 8-bit device could be utilized with the present invention, although only one byte rather than two bytes would be transferred by state machine 258(*a*).

Upon completion of the transfer of these two bytes, Read control 330 will follow one of two courses of action. If additional data from this packet remains to be transferred from the I/O controller to main memory 224 (i.e., an end of packet signal has not been received over control line 342) and the FIFO 310 is not full, then Read control 330 will repeat the above process to transfer another two bytes into FIFO 310. If, however, FIFO 310 is full or the end of packet signal has been received, then Read control 330 asserts a start flush signal over control line 331 to the Read Flush 350, which proceeds to transfer the data from FIFO 310 to main memory 224, as described in more detail below.

It should also be noted that Read control 330 will also assert a start flush signal over control line 331 in response to the FLUSH bit of control register 366 being set. Thus, the software may force the DMA channel to transfer the contents of the FIFO 310 to main memory by setting the FLUSH bit.

Read Flush

The set of control lines used for the internal CPU bus arbitration, discussed in more detail below, are also coupled to Read Flush 350. The control lines include the CPU bus request signal line 270, the CPU bus grant signal line 271, and the CPU access done signal line 334.

Read Flush 350 controls the transfer of data in the FIFO 310 to main memory 224. Read Flush 350 begins this transfer, as discussed below, upon receipt of a start flush signal from Read FIFO control 330 over control line 331.

The CPU bus request signal line 270 is output from Read Flush 350 to the internal CPU bus arbiter 248 and is asserted when channel 244(*a*) has been programmed and is ready to transfer data from FIFO 310 to main memory 224. When channel 244(*a*) is granted access to the internal CPU bus 280, Read Flush 350 will receive a signal over the CPU bus grant signal line 271. The interface 235, described above, will then request access to the CPU bus 210 and, upon receiving access, transfer the entire contents of FIFO 310 to main memory 224. Upon completion of the transfer from FIFO 310 to main memory 224, Read Flush 350 receives a CPU access done signal over signal line 334 from internal CPU bus arbiter 248, which informs Read Flush 350 that the transfer is complete.

In an alternate embodiment, Read Flush 350 may receive a CPU access done signal directly from bus interface 235. This would relieve arbiter 248 of the task of sending the access done signal, however it would also require arbiter 248 to send a signal to interface 235 indicating which channel is performing the DMA transfer. The interface 235 would need to know which channel is performing the DMA transfer so it would know which channel to directly send the CPU access done signal to.

After receiving the CPU access done signal, Read Flush 350 asserts a low address increment signal over control line 375. The low address increment signal is input as a control signal into adder 370*b*, which receives as data inputs the addresses stored in the two address register portions 312*b* and 322*b*. Only one of the two addresses from registers 312*b* and 322*b* will be input to adder 370*b* at any one time, i.e., only the address of the currently active register set will be updated at any one time. This is shown by multiplexer 386*b*, which determines which register's address will be input into adder 370*b* based on the currently active register set, as stored in control register 366. The adder 370*b* also has a fixed value of 16 as an input. Thus, when adder 370*b* is activated by a low address increment signal over control line 375, the adder 370*b* will increment the address in the currently active register set by 16 and store this new address in the address register of the currently active register set.

It should be noted that in the ethernet receive channel 244(*a*) of the preferred embodiment the FIFO buffer 310 is 16 bytes; thus, each transfer of a portion of the entire data set to be transferred to main memory 224 from the I/O controller is done in 16-byte increments. Therefore, by incrementing the address in the address register by 16, the address is incremented to the location of the next 16-byte portion of data to be transferred to main memory 224. It should also be noted that the preferred embodiment of the ethernet receive channel 244(*a*) of the present invention shown in FIG. 3A only utilizes bits 4–31 of the 32-bit register; i.e., bits 0-3 are hardwired to zero. These four bits are hardwired to zero because transfers are made in 16-byte blocks; thus there is no need to store a memory address that is not quad-longword (16-byte) aligned. It will be apparent to those of ordinary skill in the art that this also requires the data being transferred to start in a memory location which is quad-longword aligned, i.e., each of the last four bits of each memory address must be zero. This requirement presents no difficulty for the present invention because the starting addresses are forced to be 2 K byte aligned, as described above.

The maximum value recordable by address portions 312*b* and 322*b* is 2032 because they only contain bits [10..4] of the address. Thus, by incrementing the addresses in address register portions 312*b* and 322*b* the values in address registers 312 and 322 will circle through a 2 K-byte segment 365 until address portion 312*a* and 322*a*, respectively, is incremented. This creates the wrap around affect described above.

After incrementing the address register, Read Flush 350 asserts a flush done signal over control line 332, which is carried to Read FIFO control 330. This signal informs Read control 330 that the transfer from FIFO 310 to main memory 224 has been completed. Read Flush 350 will then go idle and wait for another start flush signal from Read control 330.

Upon receiving the flush done signal over control line 332, Read FIFO control 330 will do one of two things, depending on whether the entire packet has been received. If the last byte of the packet has not been received (as indicated by the lack of an end of packet signal), then Read control 330 will repeat the above steps, transferring more data from the packet into memory 224 through FIFO 310. If, however, the last byte of the packet has been received then a second series of actions will be taken.

First, in response to the end of packet signal, Read control 330 will send a signal to the currently active address portion 312*b* or 322*b* which clears the register, thereby making the address register 312 or 322 contain the location of the first byte of the segment 365. Read control 330 will then transfer the contents of the Receive Frame Status Register (a register in the ethernet controller) into FIFO 310, following the process above for transferring data over the I/O bus 214. The ethernet I/O state machine 258(*a*), however, will have received the end of packet signal also. In response to this signal, I/O state machine 258(*a*) will apply the correct address to read the Receive Frame Status Register (rather than the address to read data off the ethernet network), thereby transferring the contents of the register to FIFO 310. Read control 330 will then assert a start flush signal to Read Flush 350, as described above, causing the contents of FIFO 310 to be written into status portion 388.

Next, Read control 330 prepares to transfer another packet of data, if one exists. Read control 330 asserts a count decrement signal over control line 376 and a high address increment signal over control line 372. The count decrement signal is input as a control signal into adder 380, which receives as data inputs the count values stored in the two count registers 314 and 324. Only one of the two count values from registers 314 and 324 will be input to adder 380 at any one time, i.e., only the count value of the currently active register set will be updated at any one time. This is shown by multiplexer 387, which determines which register's count value will be input into adder 380 based on the currently active register set, as stored in control register 366.

The ethernet receive channel 244(a) shown in FIG. 3A also has as input to adder 380 a fixed value of −1. Thus, when adder 380 is activated by a count decrement signal over control line 376 the adder 370 will decrement the value in the currently active register set by 1 and store this new count value in the count register of the currently active register set.

The high address increment signal over control line 372 is input as a control signal to adder 370a, which receives as data inputs the address portions stored in registers 312a and 322a. Only one of the two address values will be input to adder 370a at any one time, i.e., only the address portion of the currently active register set will be updated at any one time. This is shown by multiplexer 386a which determines which register's address portion will be input into adder 370a based on the currently active register set, as stored in control register 366. It should be noted that after the high address portions in registers 312a or 322a have been updated, the address stored in register 312 or 322 is the address of the first quad longword in data portion 389 of the next segment 365 (assuming a next segment exists) because the act of writing the Receive Frame Status Register into status portion 388 of the segment 365 incremented the low address portion stored in register 312b or 322b.

After writing the control information to status portion 388, decrementing the count register and incrementing the address register to contain the location of the next segment, Read control 330 will either receive another packet or switch active register sets, depending on the value in the count register of the active register set. If the value in the count register is greater than zero, then Read control 330 will repeat the above process to receive another packet of data. If, however, the value in the count register is zero (the TERMCNT bit of the command/status register is set), then Read control 330 will go idle and send a switch register set signal to combinatorial logic 360. This signal will cause the active register set to be switched; the active register byte will be updated in control register 366 and the other register set will become the active register set. If the newly activated register set is enabled, which is discussed in more detail below, then Read control 330 will repeat the above described process for the newly activated register set.

It should be apparent that the preferred embodiment of the present invention allows two chains of packets to be received consecutively without intervention by the CPU 222. That is, after transfer is complete for one register set, the hardware will switch active register sets and proceed with the newly activated register set's transfer. Therefore, since the maximum number of packets per DMA transfer is 1023, the DMA controller 218 can transfer up to 2046 packets without being concerned with interrupt latency.

Combinatorial Logic

FIG. 4 shows the registers used in the preferred embodiment of the present invention. A single bus error interrupt enable register (BERRIE) 410 and a single interrupt status register (ISR) 420 contain control information for all DMA channels 244 in the DMA controller 218. A channel control register 430 contains control information for a particular channel; there is an individual control register 430 for each channel 244 in controller 218. Two register sets, register set(0) 440 and register set(1) 450, also contain control information for each channel 244. Each register set 440 and 450 comprises three registers: memory address registers 312 and 322, count registers 314 and 324, and command/status registers 316 and 326.

A single register, BERRIE 410, is used in the preferred embodiment of the present invention to enable or disable the bus error interrupts for all the channels of the DMA controller 218. BERRIE 410 is an 8-bit register, however only bit 0 is used; bits 7–1 are undefined and reserved for future use. Bit 0 of BERRIE 410 acts as the bus error global interrupt enable. This bit is set by software to "1" to enable, or "0" to disable, the bus error interrupts for all the DMA channels 244.

The ISR 420 contains 256 bits in the preferred embodiment of the present invention. The first 32 bits are used by the preferred embodiment and the remaining 224 bits are undefined and reserved for future expansion. Each of the 32 bits used in ISR 420 corresponds to an individual DMA channel 244. If the bit for a particular register is set to "1" then the corresponding DMA channel 244 is requesting an interrupt, as determined by the setting of the CIRQ bit of the channel's control register is set. A DMA channel could be requesting an interrupt for two reasons: either the completion of a register set's DMA transfer or a bus error (BERR). The BERRIE 410 bit allows the software to deactivate the bus error interrupt, thereby making the only possible interrupt a DMA transfer complete interrupt. Once an interrupt is requested, the DMA interrupt handler may read the control register 430 of the interrupting channel to determine which of the two reasons listed above is the cause of the interrupt and respond accordingly. Note that if the BERRIE 410 bit is disabled then the interrupt handler will know that the interrupt is due to the completion of a register set's DMA transfer.

The channel control register 430 is a 16-bit register in the preferred embodiment of the present invention. The information contained in control register 430 is shown in Table 1.

Each command/status register 316 or 326 is a 16-bit register in the preferred embodiment of the present invention. The information contained within each command/status register is shown in Table 2.

TABLE 1

| Bit No. | Name | Description |
|---|---|---|
| 7–0 | SET | Active Set. This byte indicates which register set is currently active if a DMA is in progress. If a BERR occurred, then it indicates which set was active when the BERR occurred. If no DMA is currently in progress, then it indicates which set will be next to start running once a DMA transfer is activated. |
| 8 | CIRQ | Channel Interrupt Request. This bit is read only and will be set high if both the IF and IE for any one register is high. |
| 9 | FLUSH | Flush and Termination Control. Used only when the DMA channel is configured for reading (transferring data from I/O device to memory). Setting this bit causes the read control and read |

TABLE 1-continued

| Bit No. | Name | Description |
|---|---|---|
| | | flush to write the contents of the FIFO to memory until the FIFO is empty. This bit remains set until the FIFO has been emptied. Upon completion of the flush, the register set's IF will be set and its ENABLE bit cleared. |
| 10 | PAUSE | Pause/Continue Control. Setting causes the channel to pause as soon as possible; all registers will be held constant and no data will enter or leave the FIFO. Automatically set by a software or hardware RESET and also while the BERR bit is set. |
| 11 | SWRESET | Software Reset. Setting this bit causes a software reset of the DMA channel. This reinitializes the internal state machines for this channel, causes the FIFO associated with this channel to be considered empty, and clears the IFs. The SET register is set to point to Register Set 0. The ENABLED bits of both registers are cleared. The BERR flag will be cleared and the PAUSE bit will be set. No other registers are affected. |
| 12 | CIE | Channel Interrupt Enable. Setting this bit allows an active CIRQ to cause an overall DMA interrupt request. |
| 13 | BERR | Bus Error. If this bit is set it indicates that a bus error has occurred on the CPU bus. Once a bus error has occurred, the particular DMA channel that caused the error will halt (its PAUSE bit is set) and its status will be preserved indefinitely until either a software or hardware reset is issued. |
| 14 | FROZEN | Frozen Channel Indicator. This bit is set when the channel is PAUSEd, indicating that the PAUSE has taken effect. |
| 15 | SENSE | SENSE. On writes, if this bit is a "1", then "1's" in any of the other bit positions cause the corresponding bit to be set (if possible). If the SENSE bit is a "0" on a write, then "1's" in any of the other bits cause the corresponding bit to be cleared (if possible). |

TABLE 2

| Bit No. | Name | Description |
|---|---|---|
| 7–0 | reserved | These bits are undefined and reserved. |
| 8 | IF | Interrupt Flag. This is the register set's interrupt source. It is set when the DMA switches register sets at the completion of a DMA transfer. The overall CIRQ will go active if this bit and the register set's IE bit are both set. |
| 9 | DIR | Direction. This bit indicates in which direction the DMA channel should operate. This bit is hardwired to set in the preferred embodiment as this receive channel only reads from the I/O device to memory. |
| 10 | TERMCNT | Terminal Count. This bit is set whenever the count register contains a value of zero. If this bit is set, the IF for this register set will be set if the register set's IE is set. |
| 11 | ENABLED | Enabled. This bit is used by software to indicate to the register set hardware that the programming of this set has been completed and the set is now enabled and ready to start the transfer once the hardware makes this set the active set. This bit is cleared by the hardware when the DMA transfer terminates or by a hardware RESET or SWRESET. |
| 12 | IE | Interrupt Enable. This is the register set's interrupt enable flag. Setting this bit allows an active IF to set the CIRQ bit. Clearing the bit prevents the CIRQ from being set even if the IF bit is set. |
| 13–14 | reserved | These bits are undefined and reserved. |

TABLE 2-continued

| Bit No. | Name | Description |
|---|---|---|
| 15 | SENSE | On writes, if this bit is a "1", then "1's" in any of the other bit positions cause the corresponding bit to be set (if possible). If the SENSE bit is a "0" on a write, then "1's" in any of the other bits cause the corresponding bit to be cleared (if possible). The SENSE bit is always read as a "1". |

The combinatorial logic 360 receives inputs from the CPU bus 260, the control register 366, the command/status registers 316 and 326, and the Read control 330. The combinatorial logic 360 utilizes these inputs to calculate new values for the control register 366 and command/status registers 316 and 326, described above. The values stored in control register 366 and command/status registers 316 and 326 are also made available over buses 362 and 364, respectively, to Read control 330. These outputs are utilized by Read control 330 to determine whether to begin and proceed with a transfer.

Combinatorial logic 360 also receives as input the values in the count registers 314 and 324, and will set the TERM-CNT bit of the active register set's command/status register when the value in the register set's count register is decremented to zero. Thus, this may be used by Read control 330 to determine that the programmed transfer is complete.

Internal CPU Bus Arbitration

Returning to FIG. 2B, the internal CPU bus arbiter 248 controls which DMA channel will have access to the CPU bus interface 235, and thus can write the data in its FIFO buffer 310 to main memory 224 or read data into its FIFO buffer 310 from main memory 224. The arbiter 248 is connected to DMA data multiplexer 247 and DMA transaction description multiplexer 246 through control line 278, described above.

The internal CPU bus arbiter 248 is shown in more detail in FIG. 6. Arbiter 248 is connected to the bus interface 235 over control lines 282 and 283. The CPU access request signal over line 282 is given by arbiter 248 to interface 235 to inform interface 235 that the DMA controller has a channel ready to transfer data to or from main memory 224. This signal informs interface 235 to request access to the CPU bus 210 in order to transfer the data. Access to the CPU bus 210 is determined by the CPU bus arbiter (not shown), as discussed above. Arbiter 248 will leave access to the internal CPU bus 280 with the channel 244 which requested access to the CPU bus 210 until the transfer is complete.

When the transfer is completed, interface 235 sends an access done signal to arbiter 248 over control line 283, thereby informing arbiter 248 that the requested transfer has been completed. Arbiter 248 therefore begins arbitration again to determine which DMA controller channel 244 will be allowed access to the internal CPU bus 280.

Ethernet receive channel 244(a) asserts a CPU bus request signal over control line 270 to arbiter 248 whenever it has data in its FIFO buffer ready to be transferred to main memory 224. Bus arbiter 248 will assert a CPU bus grant signal over control line 271 to channel 244(a) when the arbiter 248 determines the channel 244(a) can have access to the internal CPU bus 280, and therefore the CPU bus 210.

Arbitration for the internal CPU bus 280 is carried out following a predetermined fixed priority scheme. That is, the arbiter 248 is preprogrammed with a specific priority order—high priority channels are given access to the internal CPU bus 280 before low priority channels. Which channel is given a higher priority is determined by the system designer, taking into account the ability of the corresponding I/O controller to tolerate long waiting periods.

In the preferred embodiment of the present invention, the sound I/O DMA channels have the highest priority because they are the least tolerant to waiting long periods for access to the CPU bus. The SCSI controller is the lowest priority because it is the least affected by long waiting periods. The ethernet receive channel has a priority in between these two extremes.

It should also be noted that the arbiter for the CPU bus (not shown) is designed to allocate sufficient bandwidth to the DMA controller 218 so that all channels will be able to gain access to the CPU bus 210. That is, higher priority DMA channels will not be able to starve out lower priority DMA channels because of insufficient access to the CPU bus 210.

One such arbitration scheme is described in copending U.S. patent application Ser. No. 08/189,138 "Memory Bus Arbiter for a Computer System Having a DSP Co-processor", invented by Michael J. Bowes and Farid A. Yazdy, assigned to the assignee of the present invention and filed concurrently herewith. That application describes an arbitration scheme implemented for a memory bus shared by four bus masters: the CPU, the present invention DMA controller, a NuBus controller and a digital signal processor for carrying out real-time signal processing. Of course, the present invention DMA controller may be implemented in less complicated systems in which the CPU bus constraints are less critical than the arrangement described in that application.

I/O Bus Arbitration

Returning to FIG. 2B, the I/O bus arbiter 250 controls whether the DMA controller 218 or the CPU 222 will have access to the I/O controllers 237 at any particular moment. If the arbiter 250 determines that the DMA controller 218 will have access to the I/O controller 237 at a particular moment then the arbiter further determines which DMA controller channel 244, including ethernet receive channel 244(a), will be given access to the I/O controllers 237.

Arbiter 250 controls which channel 244, or CPU 222, will have access through the I/O multiplexer 252. Multiplexer 252 receives control signals from arbiter 250 over I/O multiplexer control line 284. Multiplexer 252 receives data bus 264 and CPU output bus 260 as input. The inputs to multiplexer 252 are multiplexed onto I/O bus 214.

Arbiter 250 receives as input CPU I/O access request control line 288 and DMA I/O bus request lines 274 as shown in more detail in FIG. 7A. CPU I/O access request line 288 carries a signal from the CPU I/O interface state machine 257 that the CPU 222 is requesting access to the I/O bus 214, described in more detail below. I/O bus request line 274 informs the arbiter 250 that the DMA channel 244 is ready for a transfer to or from an I/O controller 237, as discussed above. The I/O bus request line 274 is also input to the corresponding I/O state machine 258, which allows the state machine 258 to prepare for a data transfer. The device ready signal informs arbiter 250 over device ready line 514 that the I/O controller 237 which corresponds to this state machine 258 is ready for data transfer; the determination of this readiness is discussed in more detail below.

Arbiter 250 will determine which channel, of those fully ready for transfer, is entitled to access to the I/O bus 214. A channel is considered fully ready for transfer if two conditions are met: first, arbiter 250 must receive an I/O bus request signal from the channel 244, and second, arbiter 250 must receive a device ready signal over line 514 from the corresponding I/O state machine 258. Thus, if a channel is fully ready both the channel 244 is ready for transfer and the corresponding I/O controller 237 is ready, so that once access to the I/O bus 214 is granted the transfer can begin. Note that even if a controller is fully ready, the I/O state machine 258 will not attempt to access the I/O bus 214 because it will be receiving a bus busy signal over bus busy line 344. The state machine 258 will not access the I/O bus 214 until it is not receiving a busy signal over line 344 and it receives an I/O bus grant signal over control line 340, described below.

After a channel is fully ready it will eventually be granted access to the I/O bus 214 by the arbiter 250. When access is granted, arbiter 250 sends an I/O bus grant signal over bus grant line 340 to both the channel 244 and the state machine 258. The bus grant signal informs the channel 244 that transfer is about to begin and that it can deactivate its bus request line. The bus grant signal also informs the state machine 258 that the bus is available for its use. State machine 258 will respond to the bus grant signal by asserting a state machine busy signal over state machine busy line 512. The state machine busy signal informs the arbiter 250 that the state machine 258 has control of the I/O bus 214 and that nothing else should try to access bus 214.

Figure 7B:
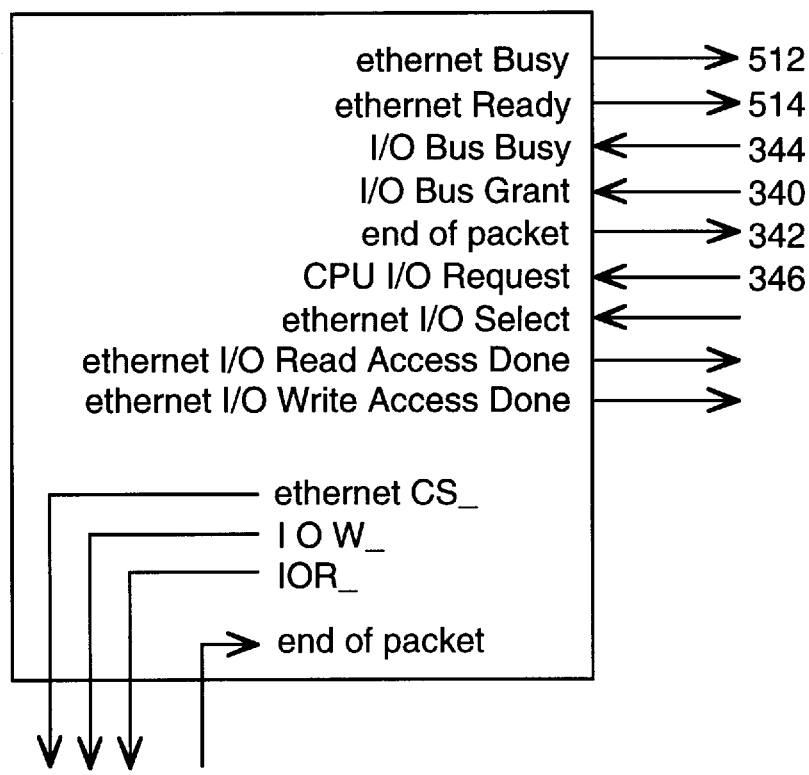
FIG. 7B is a diagram of an example ethernet state machine of the preferred embodiment of the present invention.

An example ethernet state machine is shown in FIG. 7B. The function of the I/O state machines 258, including ethernet receive state machine 258(a), is to perform the "handshake" between the DMA controller and the corresponding I/O controller 237, thereby effecting a data transfer. That is, the I/O state machines 258 transfer the two bytes of data between the I/O controllers and the FIFO 310, as discussed above. The I/O state machines operate in a conventional manner to transfer data between the DMA channels and their corresponding I/O controller. These handshake signals and the transferring of 16 bits of data between the I/O controllers and a data buffer or register are well-known to those of ordinary skill in the art and will not be described further.

Arbiter 250 determines access rights to the I/O controllers 237 using a two-step process. First, arbiter 250 determines whether the CPU 222 or the DMA controller 218 is entitled to access. Second, if the DMA controller 218 is entitled to access then arbiter 250 determines which DMA controller channel 244 is entitled to access.

Whether the CPU 222 or the DMA controller 218 is entitled to access is determined using a three stage round-robin scheme: CPU, DMA, DMA. That is, the CPU 222 will be given access to the I/O bus 214, then the DMA controller 218 will be given access twice, followed by the CPU 222 being given access, etc. Note that this round-robin scheme is applied only if both the DMA controller 218 and the CPU 222 request access to the I/O bus 214; therefore, the DMA controller 218 would be given continuous access to the I/O bus 214 if the CPU 222 never requested access. This round-robin scheme assures that both the DMA controller 218 and the CPU 222 will be given access to the I/O bus 214; neither is allowed to starve off the other, and the CPU 222 still has reasonably quick direct access to the I/O controllers. Note also that the DMA controller 218 receives twice the access that the CPU 222 receives because one objective of the present invention is to allow the CPU 222 to perform non-I/O tasks and leave the I/O tasks to the DMA controller 218.

If arbiter 250 determines that DMA controller 218 is entitled to access to the I/O bus 214 then the arbiter determines which DMA controller channel 244 is entitled to access. The channels 244 which will participate in any given arbitration are those which are fully ready, i.e., both ready for transfer themselves and whose corresponding I/O controller is ready for transfer, as described above. Arbiter 250 follows a fixed priority scheme, as described above utilized by the internal CPU bus arbiter 248. In the preferred embodiment of the present invention the fixed priority followed by arbiter 250 is the same as the fixed priority followed by arbiter 248. It should be noted, however, that this similarity is not required; the system designer may utilize different priorities depending on the circumstances.

As discussed above, if both the DMA controller 218 and the CPU 222 are requesting access to the I/O bus 214 then the I/O bus arbiter 250 of the preferred embodiment will follow a CPU/DMA/DMA round robin scheme. Thus, one out of every three accesses to the I/O bus 214 will be made by the CPU 222. For a CPU access the PSC essentially becomes a bridge between the CPU bus 210 and the I/O bus 214, bypassing the multiple channels described above. This bridge functionality allows the CPU to either set up an I/O controller for a DMA transfer or perform a direct access to an I/O controller when needed.

When the CPU 222 has access to the I/O bus 214, and the PSC is therefore acting as a bridge, the DMA channels 244 are bypassed. Thus, CPU I/O interface state machine 257 is used to augment control of the CPU access to the I/O bus 214. A series of select signals also connects interface 235 and each state machine 258. The interface 235 asserts the proper select signal based on the decoded value received from CPU 222. That is, when CPU 222 is requesting direct access to the I/O bus 214, the address CPU 222 specifies is decoded to determine the I/O controller that CPU 222 is requesting access to, and interface 235 asserts the appropriate select signal. Note that additional state machines (not shown) may exist for additional system resources which only operate in slave mode, i.e., devices which would not be participating in a DMA transfer.

A CPU I/O request signal is also asserted to CPU I/O interface state machine 257 from interface 235 when the CPU 222 is requesting access to the I/O bus 214. Upon receipt of the CPU I/O request signal, CPU I/O interface 257 asserts a signal over CPU I/O access request line 288 to arbiter 250. When arbiter 250 grants I/O bus access to the CPU 222, as described above, arbiter 250 will assert a CPU I/O request signal 346 to all the I/O state machines 258 and CPU I/O interface state machine 257. Each state machine 258 will combine this signal 346 with its select line input from interface 235. If both the signal line 346 and the select line from interface 235 are set, and the I/O bus busy signal on line 344 is deasserted, then the I/O state machine will assert its state machine busy line 512 and will perform the desired transfer of data with its corresponding I/O controller. CPU I/O interface state machine 257 receives as input the I/O bus busy signal 344 and the CPU I/O request signal 346 from arbiter 250. When interface 257 observes CPU I/O request signal 346 asserted and I/O bus busy signal 344 deasserted, it knows the I/O state machine is about to make the transfer. Arbiter 250 then asserts I/O bus busy line 344 in response to the state machine asserting its state machine busy line 512. Upon completion of the transfer, the state machine will release (deassert) its state machine busy line 512, which causes I/O arbiter 250 to deassert I/O bus busy line 344. This second deassertion of the I/O bus busy line 344 indicates to CPU I/O interface state machine 257 that the access has been completed. In response, the CPU I/O interface state machine 257 will send a CPU I/O access done signal to interface 235, thereby informing CPU 222 that the access to the I/O bus has been completed.

The preferred embodiment of the present invention, a direct memory access channel architecture and method for reception of network information, is thus described. While the present invention has been described in particular embodiments, it should be appreciated that the present invention should not be construed as limited by such embodiments, but rather construed according to the below claims.

What is claimed is:

1. A method for transferring packets of data from an input/output (I/O) device to a main memory of a computer system with a direct memory access (DMA) controller, wherein the computer system includes a first bus and a second bus coupled to the DMA controller, and wherein the DMA controller includes a buffer and at least one register set which includes an address register, the method comprising the steps of:

establishing at least one buffer in said main memory, wherein each of said at least one buffer in said main memory comprises at least one segment, and wherein each of said at least one segment corresponds to one of said packets of data;

determining a first packet of said packets of data;

initially setting a number of most significant bits of said address register equal to corresponding most significant bits of an address of a first memory location of said corresponding segment in said main memory;

initially setting a next higher least significant bit over a number of least significant bits of said address register to one;

transferring a portion of said first packet from said I/O device to said buffer in said DMA controller via said second bus;

transferring said portion of said first packet from said buffer in said DMA controller to a location of said corresponding segment in said main memory, via said first bus, wherein said location is indicated by an address stored in said address register, wherein said number of least significant bits of said address register are hardwired to zero, and wherein a number of memory locations corresponding to addresses represented by said number of least significant bits is equal in size to said portion of said first packet;

incrementing said address register by an amount equal in size to said portion of said first packet after transferring each said portion of said first packet from said buffer in said DMA controller to said corresponding segment in said main memory;

repeating said transferring said portion steps and said incrementing said address register step until said first packet is completely transferred to said corresponding segment in said main memory;

transferring status data from a status register of said I/O device to said buffer in said DMA controller in response to a final portion of said first packet being transferred to said corresponding segment;

resetting said number of most significant bits of said address register equal to said corresponding most significant bits of said address of said first memory location of said corresponding segment in said main memory, in response to transferring said final portion of said first packet;

resetting said next higher least significant bit over said number of least significant bits of said address register to zero, wherein an address of a beginning location of said corresponding segment is indicated by said address stored in said address register;

transferring said status data from said buffer in said DMA controller to said beginning location of said corresponding segment;

incrementing said address register by an amount equal in size to said portion of said first packet after transferring said status data from said buffer in said DMA controller to said beginning location of said corresponding segment;

incrementing said address register by an amount equal to a size of one of said at least one segment in response to a final portion of said status data being transferred to said corresponding segment; and decrementing a packet count by one in response to said final portion of said status data being transferred to said corresponding segment.

2. The method for transferring data as claimed in claim 1 further comprising the steps of:

determining a second packet of said packets of data; and repeating said initially setting said number of most significant bits through said decrementing said packet count for said second packet.

3. The method for transferring data as claimed in claim 1 wherein said at least one segment is a plurality of contiguous segments.

4. The method for transferring data as claimed in claim 1 wherein each segment of said at least one segment comprises a status portion and a data portion.

5. A computer system having a first bus coupled to a memory unit, a second bus attached to an input/output (I/O) device, and a direct memory access (DMA) controller coupled to said first bus and said second bus, and having at least one channel for transferring portions of packets of network information from said first bus to said second bus, said computer system comprising:

at least one register set associated with each channel of said at least one channel, wherein each said at least one register set includes an address register and a count register, wherein a number of least significant bits of said address register are hardwired to zero, and wherein a number of memory locations corresponding to addresses represented by said number of least significant bits is equal in size to one of said portions of said packets;

at least one DMA data buffer associated with said DMA controller which stores said portions of said packets being transferred from said second bus to said first bus;

at least one memory buffer contained within said memory unit, said at least one memory buffer comprising at least one buffer segment, wherein each of said at least one buffer segment corresponds to one of said packets of network information; and a control logic unit, associated with said DMA controller, which initially sets a number of most significant bits of said address register equal to corresponding most significant bits of an address of a first memory location of said corresponding segment in said memory unit of one of said packets, initially sets a next higher least significant bit over said number of least significant bits of said address register to one, increments said address register by an amount equal in size to said portion of one of said packets after transferring each said portion of one of said packets to said corresponding segment in said memory unit, resets said number of most significant bits of said address register equal to said corresponding most significant bits of said address of said first memory location of said corresponding segment in said memory unit of one of said packets in response to transferring a final portion of one of said packets, resets said next higher least significant bit over said number of least significant bits of said address register to zero so that an address of a beginning location of said corresponding segment is indicated by said address stored in said address register, transfers status data from a status register of said I/O device to said beginning location of said corresponding segment via said DMA controller when said final portion of one of said packets is received by said memory unit, increments said address register by an amount equal in size to said portion of one of said packets after transferring said status data to said beginning location of said corresponding segment, and wherein said control logic also increments said address register by amount equal to a size of said at least one buffer segment when a final portion of said status data is received by said corresponding segment, and decrements said count register by one when said final portion of said status data is received by said corresponding segment.

6. A computer system as claimed in claim 5 wherein said at least one buffer segment is a plurality of contiguous segments contained within said at least one memory buffer.

7. A computer system as claimed in claim 5 wherein each buffer segment of said at least one buffer segment comprises a status portion and a data portion.

8. A computer system as claimed in claim 5 wherein each register set of said at least one register set comprises a counter.

9. A computer system as claimed in claim 5 wherein each register set of said at least one register set comprises a command/status register.

10. A computer system as claimed in claim 5 further comprising at least one control register corresponding to individual channels of said at least one channel and corresponding to said at least one register set associated with each channel of said at least one channel, wherein different channels correspond to different chains of network information being transferred.

11. A computer system as claimed in claim 10 wherein only one register of said at least one register set associated with each channel can be active at any given moment and each control register of said at least one control register contains a portion which denotes said active register set.

12. A computer system as claimed in claim 10 wherein each control register of said at least one control register contains a portion which denotes whether said channel is able to transfer data at any given moment.

13. A computer system as claimed in claim 5 wherein each register set of said at least one register set contains a portion which denotes programming of said at least one register set is complete and that said at least one register set is ready to transfer data.

14. A direct memory access (DMA) controller having at least one channel coupled to a first bus and a second bus, said first bus being coupled to a memory unit having at least one memory buffer, each memory buffer of said at least one memory buffer comprising at least one buffer segment, each of said at least one buffer segment corresponding to a packet of network information, said second bus being attached to an input(output (I/O) device, said DMA controller comprising:

a control logic unit;

at least one register set associated with each channel of said at least one channel, wherein each register set of said at least one register set comprises a counter which maintains a count of a number of network information packets remaining to be received and an address register which maintains an address where a next portion of one of said network information packets is to be stored, wherein a number of least significant bits of said address register are hardwired to zero and a number of memory locations corresponding to addresses represented by said number of least significant bits is equal in size to one of said portions of said packets, and wherein the control logic unit initially sets a number of most significant bits of said address register equal to corresponding most significant bits of an address of a first memory location of said corresponding segment in said memory unit of one of said packets, initially sets a next higher least significant bit over said number of least significant bits of said address register to one, increments said address register by an amount equal in size to said portion of one of said packets after transferring each said portion of one of said packets to said corresponding segment in said memory unit, resets said number of most significant bits of said address register equal to said corresponding most significant bits of said address of said first memory location of said corresponding segment in said memory unit of one of said packets in response to transferring a final portion of one of said packets, resets said next higher least significant bit over said number of least significant bits of said address register to zero wherein an address of a beginning location of said corresponding segment is indicated by said address stored in said address register, transfers status data from a status data register of said I/O device to said beginning location of said corresponding segment via said DMA controller when said final portion of one of said network information packets is received, increments said address register by an amount equal in size to said portion of one of said packets after transferring said status data to said beginning location of said corresponding segment, and increments said address register by an amount equal to a size of one of said at least one buffer segments when said final portion of said status data is received; and a DMA data buffer associated with each channel of said at least one channel, wherein said DMA data buffer stores portions of said network information packets being transferred between said second bus and said first bus.

15. A direct memory access controller as claimed in claim 14 wherein said DMA data buffer is configured such that said DMA data buffer operates in a first in-first out manner.

16. A direct memory access controller as claimed in claim 14 wherein each register set of said at least one register set comprises a command/status register.

17. A direct memory access controller as claimed in claim 14 further comprising a plurality of control registers corresponding to individual channels of said at least one channel and corresponding to said at least one register set associated with each channel of said at least one channel.

* * * * *

UNITED STATES PATENT AND TRADEMARK OFFICE
CERTIFICATE OF CORRECTION

PATENT NO. : 5,805,927
DATED : September 8, 1998
INVENTOR(S) : Bowes et al.

It is certified that error appears in the above-identified patent and that said Letters Patent is hereby corrected as shown below:

In column 24 at line 67 delete "input(output" and insert --input/output--

Signed and Sealed this

First Day of June, 1999

Attest:

Q. TODD DICKINSON

*Attesting Officer*         *Acting Commissioner of Patents and Trademarks*